US011112022B2

(12) United States Patent
Heyral

(10) Patent No.: US 11,112,022 B2
(45) Date of Patent: Sep. 7, 2021

(54) MODULE FOR A KIT FOR DISTRIBUTING AND REGULATING A PRESSURIZED GAS, ASSOCIATED DISTRIBUTION AND REGULATION KIT AND SYSTEM

(71) Applicant: ALCRYS FLUID-CONTROL & SERVICES, Gardanne (FR)

(72) Inventor: Olivier Heyral, Meyreuil (FR)

(73) Assignee: ALCRYS FLUID-CONTROL & SERVICES, Gardanne (FR)

( * ) Notice: Subject to any disclaimer, the term of this patent is extended or adjusted under 35 U.S.C. 154(b) by 0 days.

(21) Appl. No.: 16/780,067

(22) Filed: Feb. 3, 2020

(65) Prior Publication Data

US 2020/0173571 A1    Jun. 4, 2020

Related U.S. Application Data

(63) Continuation of application No. PCT/FR2018/051989, filed on Aug. 1, 2018.

(30) Foreign Application Priority Data

Aug. 3, 2017 (FR) .................................... 17/57483

(51) Int. Cl.
*F16K 27/00* (2006.01)
*F17C 13/00* (2006.01)

(52) U.S. Cl.
CPC ............ *F16K 27/003* (2013.01); *F17C 13/00* (2013.01); *F17C 2205/0338* (2013.01);
(Continued)

(58) Field of Classification Search
CPC .................... F16K 27/003; F17C 13/00; F17C 2205/0338; F17C 2205/0388;
(Continued)

(56) References Cited

U.S. PATENT DOCUMENTS 3,538,940 A * 11/1970 Graham ................ F16L 37/144
137/271
3,747,623 A *  7/1973 Greenwood ............ F16K 11/22
137/269
(Continued)

FOREIGN PATENT DOCUMENTS

WO    2005008107    1/2005
WO    2017063707    4/2017

OTHER PUBLICATIONS

International Search Report for International Application PCT/FR2018/051989, dated Nov. 23, 2018.

*Primary Examiner* — Jessica Cahill
(74) *Attorney, Agent, or Firm* — Burriis Law, PLLC

(57) ABSTRACT

A module includes a parallelepiped main body having four lateral faces extending between an upper face and a lower face, in which an inner chamber is provided in the main body, opening in the top and bottom faces in order to receive, on the inside, a distribution or regulation device. The inner chamber includes, consecutively, an upper bore, an intermediate bore that has a smaller diameter than the upper bore, and a lower bore that has a smaller diameter than the intermediate bore. A plate is provided on each lateral face for attachment to a plate of a similar adjacent module, the plate having peripheral holes used for the passage of attachment screws and a central blind hole suitable for guiding a drill hole opening in the upper bore or in the intermediate bore.

17 Claims, 22 Drawing Sheets

(52) U.S. Cl.
CPC .............. *F17C 2205/0388* (2013.01); *F17C 2223/036* (2013.01); *Y10T 137/87885* (2015.04)

(58) Field of Classification Search
CPC ......... F17C 2223/036; Y10T 137/5283; Y10T 137/87885; Y10T 137/5109
See application file for complete search history.

(56) References Cited

U.S. PATENT DOCUMENTS

| | | | | |
|---|---|---|---|---|
| 3,756,274 | A * | 9/1973 | Wolfgramm | F15B 13/0821 137/561 R |
| 5,107,898 | A * | 4/1992 | Keeney | F17C 13/025 137/871 |
| 5,642,756 | A * | 7/1997 | Lawrence | F15B 13/0814 137/271 |
| 5,709,247 | A * | 1/1998 | Hutton | F15B 13/0814 137/597 |
| 5,860,676 | A | 1/1999 | Brzezicki et al. | |
| 6,009,758 | A * | 1/2000 | Petrich | F16K 27/0263 137/597 |
| 6,302,141 | B1 | 10/2001 | Markulec et al. | |
| 6,837,269 | B2 * | 1/2005 | Reinelt | F15B 13/0405 137/454.2 |
| 8,613,295 | B2 * | 12/2013 | Huang | F15B 13/0835 137/884 |
| 10,024,447 | B2 * | 7/2018 | Rado | F16K 27/003 |
| 10,627,034 | B2 * | 4/2020 | Sasaki | F16K 27/003 |
| 10,648,575 | B2 * | 5/2020 | Smith | F16K 11/0716 |
| 10,655,773 | B2 * | 5/2020 | Lee | F16K 11/20 |
| 10,663,072 | B2 * | 5/2020 | Birtcher | F16K 27/00 |
| 10,746,201 | B2 * | 8/2020 | Weickel | F15B 13/0871 |
| 2008/0271796 | A1 * | 11/2008 | Neumann | F17C 7/00 137/606 |
| 2014/0305115 | A1 * | 10/2014 | Matsuda | F16K 15/186 60/338 |
| 2015/0314760 | A1 * | 11/2015 | Weh | B60T 8/368 137/884 |

\* cited by examiner

US 11,112,022 B2

MODULE FOR A KIT FOR DISTRIBUTING AND REGULATING A PRESSURIZED GAS, ASSOCIATED DISTRIBUTION AND REGULATION KIT AND SYSTEM

CROSS-REFERENCE TO RELATED APPLICATIONS

This application is a continuation of International Application No. PCT/FR2018/051989, filed on Aug. 1, 2018, which claims priority to and the benefit of FR 17/57483, filed on Aug. 3, 2017. The disclosures of the above applications are incorporated herein by reference.

FIELD

The present disclosure relates to a module for a kit for distributing and regulating a pressurized gas, a kit for distributing and regulating a pressurized gas, and a system for distributing and regulating a pressurized gas constructed from such a kit.

BACKGROUND

The statements in this section merely provide background information related to the present disclosure and may not constitute prior art.

In gaseous hydrogen distribution stations, the gaseous hydrogen is compressed at a very high pressure (at least higher than 500 bars and even beyond 700 to 1000 bars) and stored in buffer tanks, and a distribution and regulation system is necessary, upstream and downstream of the buffer tanks, to perform safe relief and distribution of the gaseous hydrogen towards the tank of the fuel cell.

Such a distribution and regulation system requires the use of distribution or regulation devices such as block valves with a manual actuation, block valves with a pneumatic actuation, block valves with an electric actuation (solenoid-valves), pressure regulators, anti-backflow isolation devices (or anti-backflow plungers), safety relief valves, filtering devices, etc.

Conventionally, distribution and regulation systems are constituted by an assembly of distribution or regulation devices originating from different manufacturers, constituting heterogeneous components that are uneasy to implement and requiring numerous connectors, welds and supports and the maintenance operations thereof are made complicated because of the design of the components itself as well as the disparity of the distribution or regulation devices.

SUMMARY

This section provides a general summary of the disclosure and is not a comprehensive disclosure of its full scope or all of its features.

The present disclosure provides a distribution and regulation system constructed from a kit, in turn based on a specific module, to be able to provide a system that has small bulk, and is reliable, safe, easy to maintain and to service and simple to use.

To this end, the present disclosure provides a module for a kit for distributing and regulating a pressurized gas, the module comprising a main body having a parallelepiped general shape and having four lateral faces parallel in pairs and extending between an upper face and a lower face parallel to one another,
wherein an inner chamber is formed in the main body by crossing it therethroughout to open into the upper face and into the lower face, said inner chamber being intended to receive thereinside a distribution or regulation device provided for a distribution or regulation of a gas passing in the inner chamber, said inner chamber successively comprising:
a cylindrical upper bore opening into the upper face;
a cylindrical intermediate bore having an internal diameter which is smaller than the internal diameter of the upper bore; and
a cylindrical lower bore opening into the lower face and having an internal diameter which is smaller than the internal diameter of the intermediate bore,
wherein a subplate is provided on each lateral face adapted for fastening on a subplate of a similar adjacent module, wherein said subplate has peripheral holes serving for the passage of fastening screws and a central blind hole, in particular adapted to guide a drilling opening into the upper bore or into the intermediate bore of the inner chamber.

Such a module, as explained in greater detail below, will allow constructing a distribution and regulation system:
by associating each module to a function (for this purpose, a distribution or regulation device is mounted in the inner chamber of the main body of the module);
by drilling the main bodies in order to form at least one inlet channel and at least one outlet channel opening both into the inner chamber of the main body and into central holes of the subplates, these central holes then respectively defining at least one inlet and at least one outlet of the module; and
by coupling the subplates of the modules together so as to connect the inlets and outlets of the modules tighter, and thus set in communication the distribution or regulation devices mounted on the different modules.

The modules provide an easy to construct distribution and regulation system according to a predefined circuit and with predefined functions distributed along the circuit, and subsequently replace or modify a function on need, and even reassemble the modules together according to a new configuration.

It should be understood that, in the context of the present disclosure, the module could be provided without the drilling(s), to the extent that the module may be "universal" by being usable in various configurations, and the drilling(s) will be performed according to the retained use of the module.

According to one feature, threaded holes are formed in the upper face for fastening a bracket secured to the distribution or regulation device.

Thus, the distribution or regulation device is fastened on the module via a bracket screwed on the upper face of the main body, to tightly hold in place the distribution or regulation device inside the inner chamber of the main body.

According to one variant, the module is constituted by the main body which is made integrally in one piece.

The present disclosure also relates to a kit for distributing and regulating a pressurized gas, wherein the kit comprises:
several modules in accordance with the present disclosure, wherein the modules are similar; and
several distribution or regulation devices provided for a distribution or regulation of a gas passing in the inner chambers of the main bodies of the modules,
wherein each distribution or regulation device comprises a cartridge formed by a tubular body adapted to be received inside an inner chamber of any of the modules, wherein the cartridge successively comprises:

a first cylindrical upper sleeve supporting at least one O-ring gasket and intended to be tightly mounted in the upper bore;

a second cylindrical upper sleeve having an external diameter which is, on the one hand, smaller than the internal diameter of the upper bore and the external diameter of the first upper sleeve and, on the other hand, larger than the internal diameter of the intermediate bore, said second upper sleeve having at least one upper through hole opening into an upper chamber delimited at least partially by the second upper sleeve;

a first cylindrical intermediate sleeve supporting at least one O-ring gasket and intended to be tightly mounted in the intermediate bore, said first intermediate sleeve having an external diameter which is smaller than the external diameter of the second upper sleeve;

a second cylindrical intermediate sleeve having an external diameter which is, on the one hand, smaller than the internal diameter of the intermediate bore and the external diameter of the first intermediate sleeve and, on the other hand, larger than the internal diameter of the lower bore, said second intermediate sleeve having at least one intermediate through hole opening into an intermediate chamber delimited at least partially by the second intermediate sleeve; and a cylindrical lower sleeve having an external diameter which is smaller than the external diameter of the second intermediate sleeve, wherein said lower sleeve supports at least one O-ring gasket and is intended to be tightly mounted in the lower bore.

Thus, each distribution or regulation device has a similar cartridge, in other words a cartridge with similar geometry, shape and dimensions, which allows for an integration of the different functions on any of the modules, each module having a similar inner chamber, in other words an inner chamber with a similar geometry, shape and dimensions. In one example, the cartridge of each distribution or regulation device has the same geometry, shape and dimension, and the inner chamber of each module has the same geometry, shape and dimension.

In one particular form, at least one distribution or regulation device comprises, inside the cartridge, a plunger movable relative to a seat between a position of closing the communication between the intermediate chamber and the upper chamber and a position of opening the communication between the intermediate chamber and the upper chamber.

According to a first possibility, the distribution or regulation devices comprise at least one pressure regulator comprising the following regulator members:

a piston slidably mounted inside the second intermediate sleeve in the intermediate chamber forming an upstream chamber, wherein said piston has an upper end forming the plunger and a lower end surrounded by an O-ring gasket and sliding inside the lower sleeve in a lower orifice which does not open outwards;

a downstream body mounted static inside the second upper sleeve and delimiting the upper chamber forming a downstream chamber (at the relieved pressure), wherein said downstream body has a central hole defining the seat forming a relief seat adapted to cooperate with the plunger;

an elastic biasing member urging the piston and the plunger in the direction of the closure position, opposite to a reduced pressure in the downstream chamber which urges the piston and the plunger in the direction of the opening position;

an upper plug mounted static inside the first upper sleeve; a tappet crossing the upper plug and adapted to exert a force on the plunger in the direction of the opening position;

wherein the piston has an inner through channel having two opposite ends comprising, on the one hand, an upper end open on the side of the downstream body and forming a drain seat and, on the other hand, a lower end open into the lower orifice of the lower sleeve, and wherein the tappet is adapted to bear on the drain seat to plug it;

and wherein the pressure regulator further comprises:

a bracket fastened on the cartridge and provided with fastening elements for fastening the pressure regulator on the upper face of any of the modules, wherein the bracket embeds a push piston slidably mounted and adapted to bear on the tappet, the push piston extending beyond the bracket; and a setting system mounted on the bracket and acting on the push piston and thus on the tappet to enable a setting of an opening force of the plunger to relieve the pressure.

Thus, such a pressure regulator is particularly adapted to the geometry of the cartridge, and therefore to the geometry of the inner chamber of a module.

In a first form of the pressure regulator, the setting system is a mechanical setting system comprising a support fastened on the bracket and supporting thereinside an elastic biasing member compressed between a lower journal on which bears the push piston and an upper journal whose position is mechanically settable in order to enable a setting of the pushing force exerted by the elastic biasing member on the push piston.

In a second form of the pressure regulator, the setting system is a pneumatic setting system comprising a support fastened on the bracket and receiving thereinside a solid main piston tightly and slidably mounted in the support, wherein the main piston acts on the push piston and is subjected to a pilot pressure source in order to enable a setting of the pushing force exerted by the main piston on the push piston.

Advantageously, the mechanical setting system and the pneumatic setting system are interchangeable as each features a support removably mounted on the same bracket.

Thus, the bracket being identical, all it needs is to dismount the mechanical setting system out of the bracket to replace it with the pneumatic setting system, or vice versa.

In one particular form, the main piston has:

an upper section providing an upper surface on which the pilot pressure acts; and a lower section providing a lower surface acting on the push piston, wherein said lower surface has a surface area smaller than the upper surface.

Advantageously, the pneumatic setting system comprises at least one secondary stage comprising a tubular secondary body tightly affixed on the support and a secondary piston tightly and slidably mounted inside the secondary body, wherein the secondary body has:

an upper portion delimiting a cylindrical upper cavity; and a lower portion crossed by a central hole having a reduced diameter in comparison with the upper cavity, wherein the secondary piston has:

an upper section providing an upper surface on which the pilot pressure acts and tightly mounted in the upper cavity of the upper portion of the secondary body; and a lower section providing a lower surface bearing on the upper surface of the main piston and tightly mounted in the central hole of the lower portion of the secondary body, wherein said lower surface of the secondary piston has a surface area smaller than the upper surface of the secondary piston, and wherein the secondary piston is provided with an inner through channel opening into its lower surface and into its upper surface, so that the pilot pressure is applied on the upper surface of the main piston throughout said inner channel.

Thus, such a secondary stage, which may be repeated, allows introducing a reduction ratio between the pilot pressure and the force exerted by the main piston on the push piston, which provides the possibility of working with a reduced pilot pressure while providing a limited vertical bulk. It should be noted that such a pressure regulator embedding such a pneumatic setting system or dome-loaded with at least one secondary stage may be considered in a context other than the present context of a distribution and regulation kit.

According to a second possibility, the distribution or regulation devices comprise at least one block valve comprising the following regulator members:

a piston slidably mounted inside the second intermediate sleeve in the intermediate chamber forming an upstream chamber, wherein said piston has an upper end forming the plunger and a lower end surrounded by an O-ring gasket and sliding inside the lower sleeve in a lower orifice opening outwards;

a downstream body mounted static inside the second upper sleeve and delimiting the upper chamber forming a downstream chamber, wherein said downstream body has a central hole defining the seat cooperating with the plunger;

an elastic biasing member urging the piston and the plunger in the direction of the closure position;

an upper plug mounted static inside the first upper sleeve;

a tappet tightly crossing the upper plug and adapted to exert a force on the plunger in the direction of the opening position, wherein the block valve further comprises:

a bracket secured to the upper plug and provided with fastening elements for fastening the block valve on the upper face of any of the modules; and an actuator mounted on the bracket and acting on the tappet to control the relative position of the plunger with respect to the seat between the closure position and the opening position.

Thus, such a block valve is particularly adapted to the geometry of the cartridge, and therefore to the geometry of the inner chamber of a module.

In one particular form, the block valve comprises an actuator selected from the group consisting of:

a manual actuator comprising a knob secured to a push member screwed in the bracket and adapted to bear on the tappet;

a pneumatic actuator comprising a support fastened on the bracket and crossed by a push piston adapted to bear on the tappet under the action of a control pressure source; and an electric actuator comprising a support fastened on the bracket and crossed by a push member adapted to bear on the tappet under the action of an electric motor.

According to one feature, the actuators of the block valve are interchangeable, each block valve having similar regulator members and a similar bracket, wherein said bracket comprises a threaded orifice inside which the push member of the manual actuator, the support of the pneumatic actuator and the support of the electric actuator can be screwed. In one example, the regulator members and the bracket of each block valve are the same.

Thus, it is possible to easily replace an actuator type with another actuator type, and even replace a defective actuator with a new actuator in the context of a maintenance or repair operation.

According to a third possibility, the distribution or regulation devices comprise at least one anti-backflow isolation device comprising the following members:

a piston slidably mounted inside the first upper sleeve in the upper chamber forming a downstream chamber, wherein said piston has a lower end forming the plunger;

a downstream body mounted static inside the second upper sleeve and delimiting the upper chamber and the intermediate chamber forming an upstream chamber, wherein said downstream body has a central hole defining the seat cooperating with the plunger subjected to the pressure of the gas in the intermediate chamber in the direction of detachment with respect to the seat;

an elastic biasing member urging the piston and the plunger in the direction of the closure position;

and wherein the anti-backflow isolation device further comprises a bracket provided with fastening elements for fastening the anti-backflow isolation device on the upper face of any of the modules, said bracket forming a closed lid so that said elastic biasing member bears on said bracket.

According to a fourth possibility, the distribution or regulation devices comprise at least one filtering device comprising a filter cartridge received inside the upper chamber and having an inlet opening into the intermediate chamber, and wherein the filtering device further comprises a bracket provided with fastening elements for fastening the filtering device on the upper face of any of the modules, said bracket forming a closed lid.

The present disclosure also concerns a system for distributing and regulating a pressurized gas, formed at least partially from a distribution and regulation kit according to the present disclosure, wherein:

modules are coupled by fastening at least one subplate of a module on a subplate of at least one adjacent module, setting in communication the central holes of the subplates fastened together;

distribution or regulation devices are fastened on the main bodies of at least one module among the plurality of modules, with their cartridges received inside the inner chambers;

drillings are formed in the central holes of the subplates which are fastened to another subplate, such drillings forming communication channels opening into the upper bore or into the intermediate bore of the inner chamber of the concerned module in order to set in communication the distribution or regulation devices of the coupled modules.

The present disclosure also relates to a gaseous hydrogen distribution station for filling a fuel cell tank, said gaseous hydrogen distribution station comprising at least one distribution and regulation system as described hereinabove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
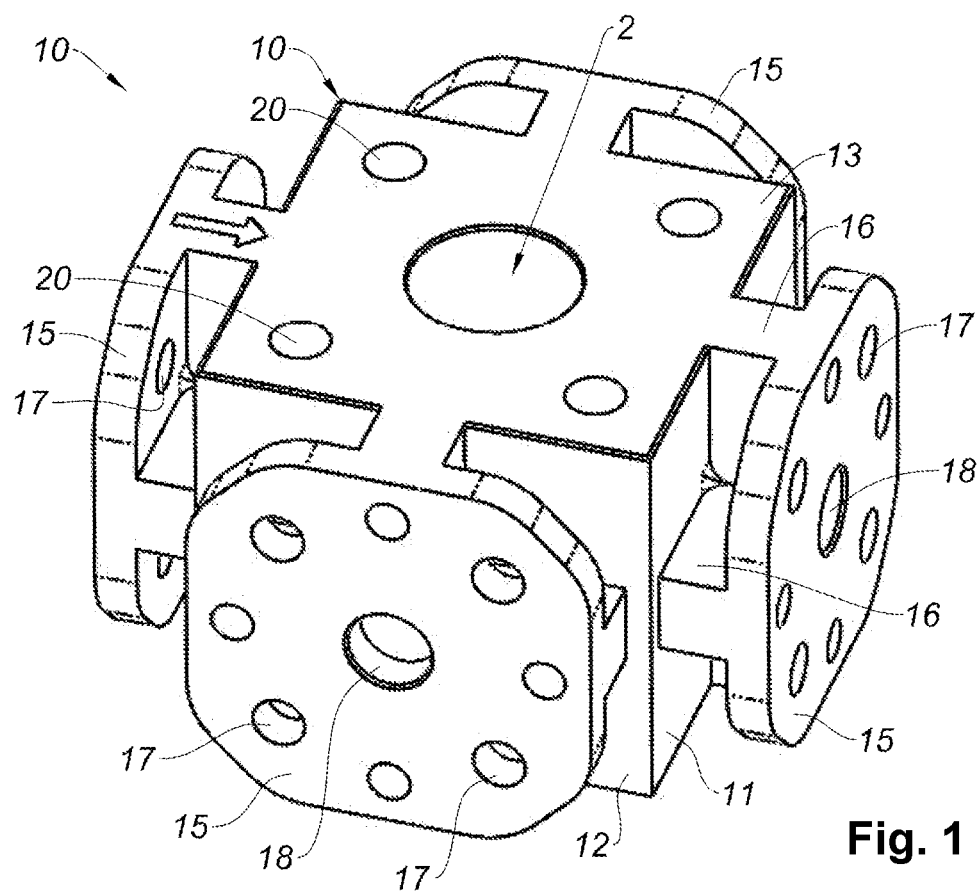
FIG. 1 is a perspective view of a module according to the present disclosure.
Figure 2:
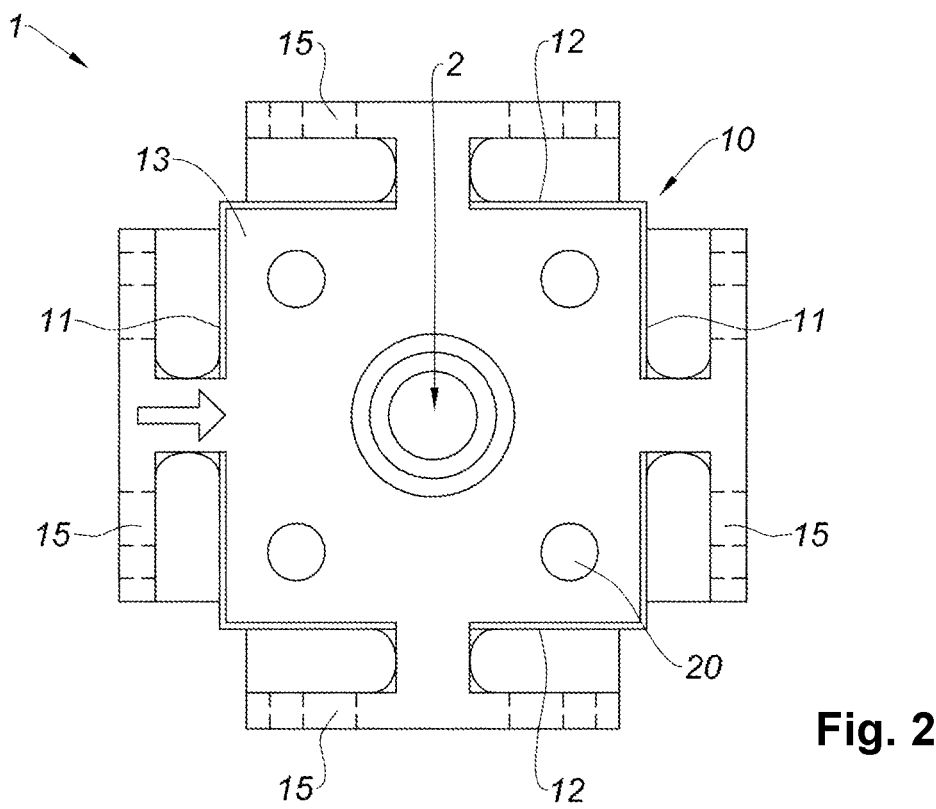
FIG. 2 is a top view of the module of FIG. 1.
Figure 3:
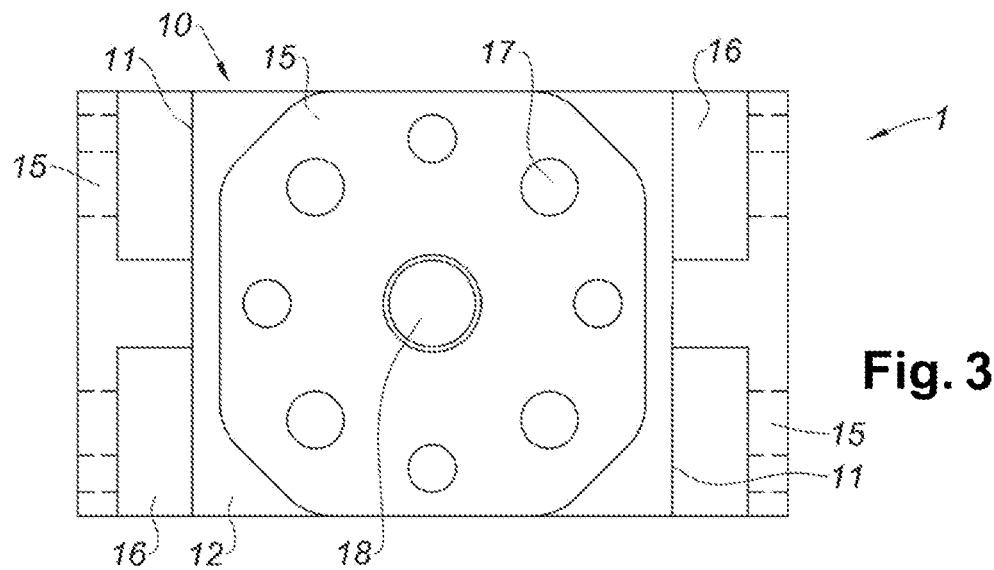
FIG. 3 is a side view of the module of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 5, a module 1, according to one form of the present disclosure, is formed by an integral part made of a metallic material which comprises a main body 10 which has a parallelepiped general shape. In some variations of the present disclosure the main body has a cubic shape.

The main body 10 has:

four lateral faces 11, 12 parallel in pairs, that is to say two first lateral faces 11 parallel to one another and two second lateral faces 12 parallel to one another and perpendicular to the first lateral faces 11, and an upper face 13 and a lower face 14 parallel to one another, the four lateral faces 11, 12 extending between the upper face 13 and the lower face 14.

Furthermore, a subplate 15 is provided on each lateral face 11, 12 parallel to the corresponding lateral face 11, 12 and spaced apart therefrom, wherein the subplate 15 is linked to the corresponding lateral face 11, 12 by ribs 16. All subplates 15 are similar in shape and dimension.

Figure 7:
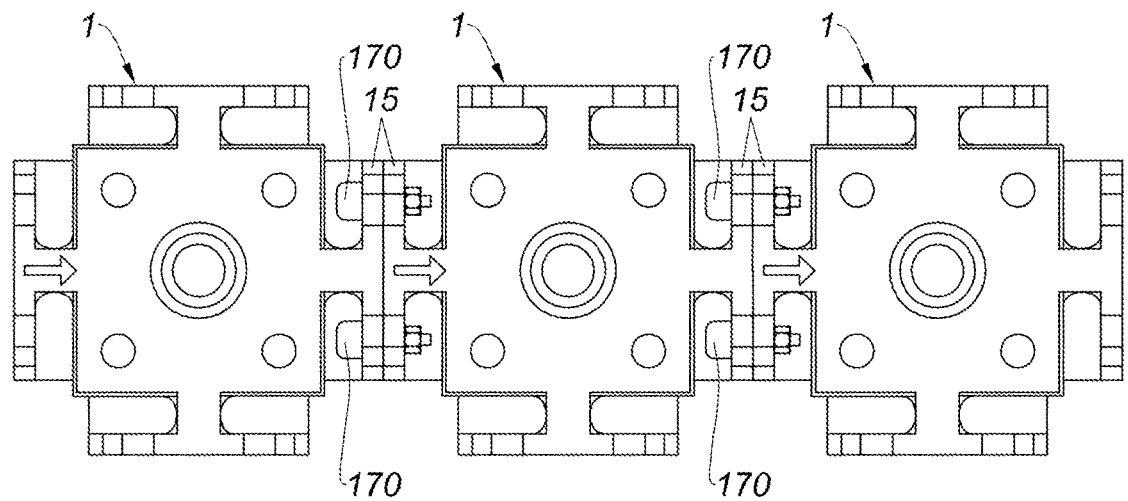
FIG. 7 is a top view of several modules coupled to form a distribution and regulation system according to one configuration of the present disclosure.
Figure 8:
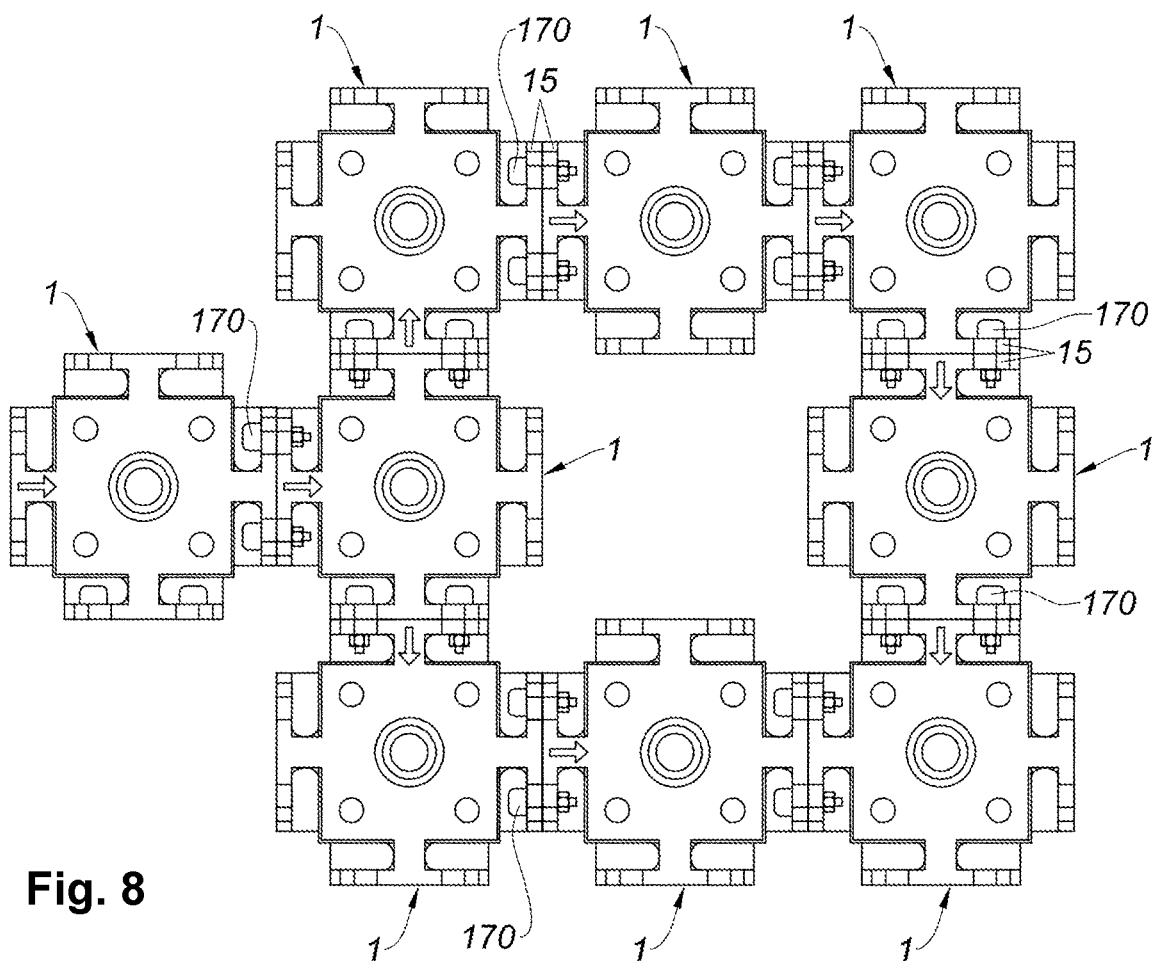
FIG. 8 is a top view of several modules coupled to form a distribution and regulation system according to another configuration of the present disclosure.

Each subplate 15 is adapted for fastening on a subplate 15 of another module 1, and, to this end, each subplate 15 has peripheral through holes 17 serving for the passage of several fastening screws 170 cooperating with nuts for fastening by bolting of the two subplates 15, as illustrated in FIGS. 7 and 8. In the illustrated example, the peripheral holes 17 are in the number of four.

Each subplate 15 also has at its center a central blind hole 18 which serves as an inlet point, and even as a guide, for a drilling which will open into an inner chamber 2.

Hence, the module 1 has an inner chamber 2 which is formed in the main body 10 by crossing it therethroughout to open into the upper face 13 and into the lower face 14. The inner chamber 2 is formed at the center of the upper face 13 and is intended to receive thereinside a distribution or regulation device 3a, 3b, 4a, 4b, 4c, 5, 6 (described in greater detail below), the distribution or regulation device 3a, 3b, 4a, 4b, 4c, 5, 6 being provided for a distribution or regulation of a gas passing in the inner chamber 2.

Figure 4:
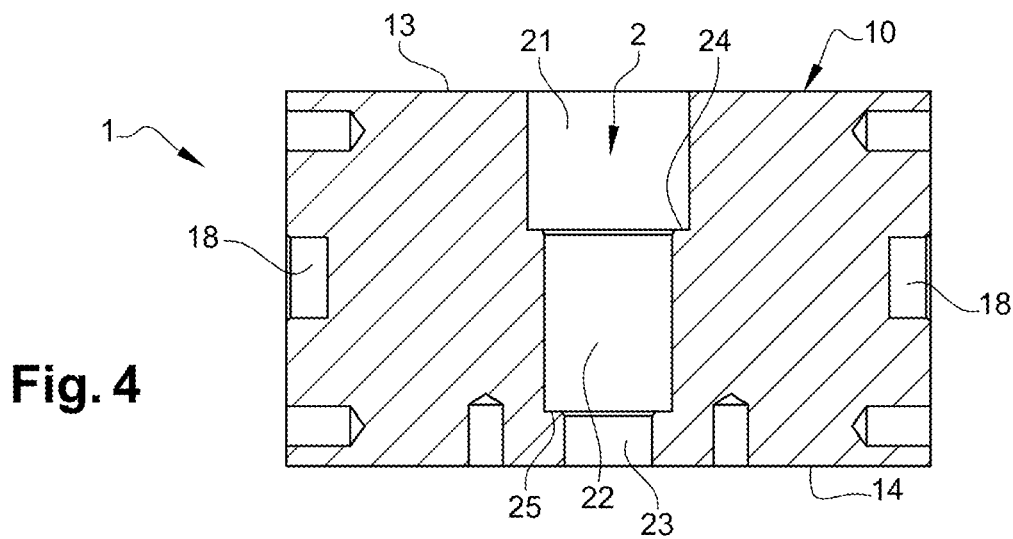
FIG. 4 is a cross-sectional view of the module of FIG. 1, according to a sectional plane perpendicular to one of the lateral faces and the upper face, in the raw making without the drillings forming communication channels.
Figure 5:
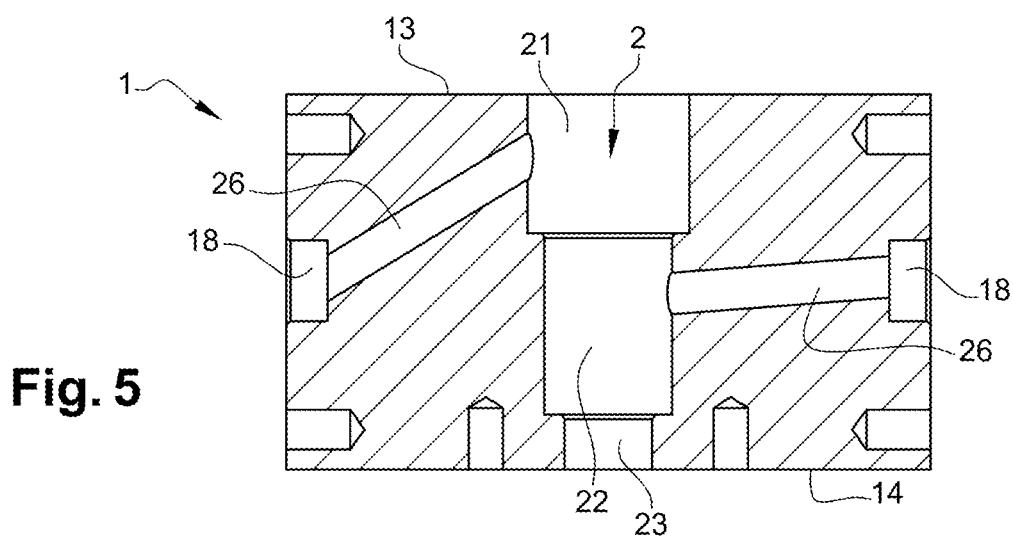
FIG. 5 is a cross-sectional view of the module of FIG. 1, according to a sectional plane perpendicular to one of the lateral faces and to the upper face, in the raw making with drillings forming communication channels.

As shown in FIGS. 4 and 5, the inner chamber 2 successively comprises:

a cylindrical and smooth upper bore 21, opening into the upper face 13 and having an internal diameter D1 (not shown), a cylindrical and smooth intermediate bore 22 having an internal diameter D2 (not shown) smaller than the internal diameter D1 of the upper bore 21, and a cylindrical and smooth lower bore 23, opening into the lower face 14 and having an internal diameter D3 (not shown) smaller than the internal diameter D2 of the intermediate bore 22.

Thus, the inner chamber 2 has:

an upper inner shoulder 24 between the upper bore 21 and the intermediate bore 22; and a lower inner shoulder 25 between the intermediate bore 22 and the lower bore 23.

Threaded blind holes 20 are formed in the upper face 13 for fastening a bracket 8, 80 or 180 (described in further detail below) of the distribution or regulation device 3a, 3b, 4a, 4b, 4c, 5, 6. In the illustrated example, the threaded holes 20 are in the number of four.

To be used, and as illustrated in FIG. 5, the module 1 has to undergo at least two drillings 26, each drilling starting in a central hole 18 to open into the inner chamber 2, and more specifically into the upper bore 21 or into the intermediate bore 22.

Depending on the distribution or regulation device 3a, 3b, 4a, 4b, 4c, 5, 6, two configurations may be considered:

the upper bore 21 is in communication with an upstream chamber (or gas inlet chamber) of the distribution or regulation device 3a, 3b, 4a, 4b, 4c, 5, 6 and the intermediate bore 22 is in communication with a downstream chamber (or gas outlet chamber) of the distribution or regulation device 3a, 3b, 4a, 4b, 4c, 5, 6; or vice versa, the upper bore 21 is in communication with a downstream chamber (or gas outlet chamber) of the distribution or regulation device 3a, 3b, 4a, 4b, 4c, 5, 6 and the intermediate bore 22 is in communication with an upstream chamber (or gas inlet chamber) of the distribution or regulation device 3a, 3b, 4a, 4b, 4c, 5, 6.

Thus, if the piecing 26 opens into a bore 21 or 22 in communication with an upstream chamber, then the corresponding central hole 18 forms an inlet "E" of the module 1, whereas if the drilling 26 opens into a bore 21 or 22 in communication with a downstream chamber then the corresponding central hole 18 forms an outlet "S" of the module 1. On each subplate 15, there can be only but one inlet "E," or only but one outlet "S," or neither inlet nor outlet.

Figure 6:
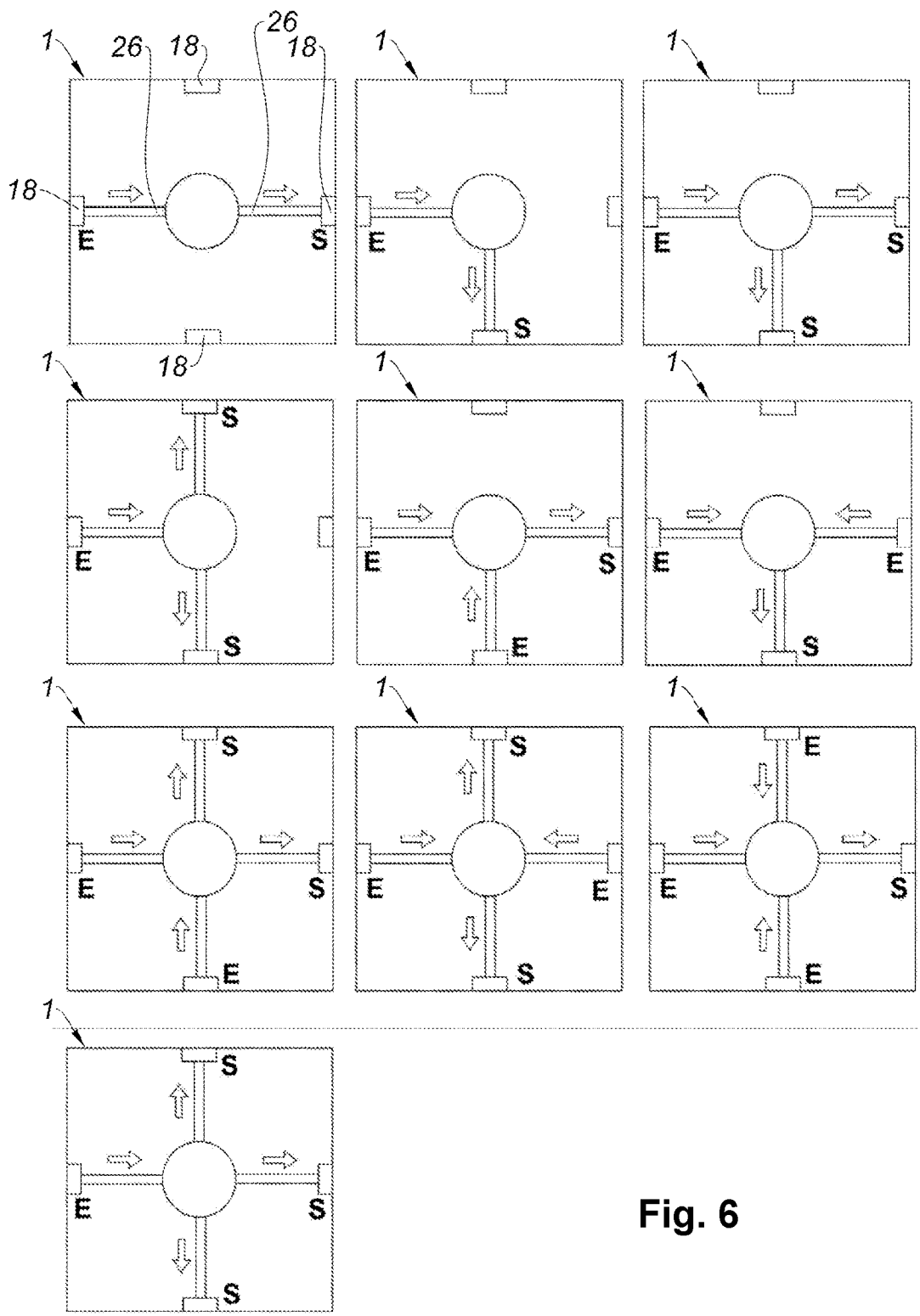
FIG. 6 is a sectional view of the module of FIG. 1, according to a sectional plane parallel to the upper face, in ten configuration examples of the arrangement of the drillings forming communication channels.

FIG. 6 illustrates six distinct configurations of the module 1 regarding the making of the drillings 26 and therefore regarding the distribution of the inlet(s) "E" and of the outlet(s) "S."

The configuration to the left side in the first row (starting from the top) corresponds to a configuration with one single inlet "E" and one single outlet "S" which are at 180° with respect to one another, that is to say that the inlet "E" and the outlet "S" correspond to central holes 18 of two parallel subplates 15.

The configuration at the middle of the first row corresponds to a configuration with one single inlet "E" and one single outlet "S" which are at 90° with respect to one another, that is to say that the inlet "E" and the outlet "S" correspond to central holes 18 of two orthogonal subplates 15.

The configuration to the right side in the first row corresponds to a configuration with one single inlet "E" and two outlets "S" which are respectively at 90° and at 180° with respect to the inlet "E", the two outlets "S" being at 90° with respect to one another.

The configuration to the left side in the second row corresponds to a configuration with one single inlet "E" and two outlets "S" which are both at 90° with respect to the inlet "E," the two outlets "S" being at 180° with respect to one another.

The configuration at the middle in the second row corresponds to a configuration with two inlets "E" and one outlet "S," the two inlets "E" being at 90° with respect to one another.

The configuration to the right side in the second row corresponds to a configuration with two inlets "E" and one outlet "S," the two inlets "E" being at 180° with respect to one another.

The configuration to the left side in the third row corresponds to a configuration with two inlets "E" and two outlets "S," the two inlets "E" being at 90° with respect to one another and the two outlets "S" being at 90° with respect to one another.

The configuration at the middle in the third row corresponds to a configuration with two inlets "E" and two outlets "S," the two inlets "E" being at 180° with respect to one another and the two outlets "S" being at 180° with respect to one another.

The configuration to the right side in the third row corresponds to a configuration with three inlets "E" and one single outlet "S."

The unique configuration in the fourth row corresponds to a configuration with one single inlet "E" and three outlets "S."

Thus, a module 1 can be coupled with one, two or three other module(s) 1, with inlet-outlet or outlet-inlet couplings depending on the desired flow direction of the gas in the different distribution or regulation devices 3a, 3b, 4a, 4b, 4c, 5, 6 received in the modules 1. Indeed, when two modules 1 are coupled, the central holes 18 of the subplates 15 fastened together are set in communication.

The following description covers the distribution or regulation devices 3a, 3b, 4a, 4b, 4c, 5, 6 and their integrations in the modules 1.

A distribution or regulation device 3a, 3b, 4a, 4b, 4c, 5, 6 is provided for a distribution or regulation of a gas passing in the inner chamber 2 of the main body 10 of the module 1 on which it is fastened.

Figure 12:
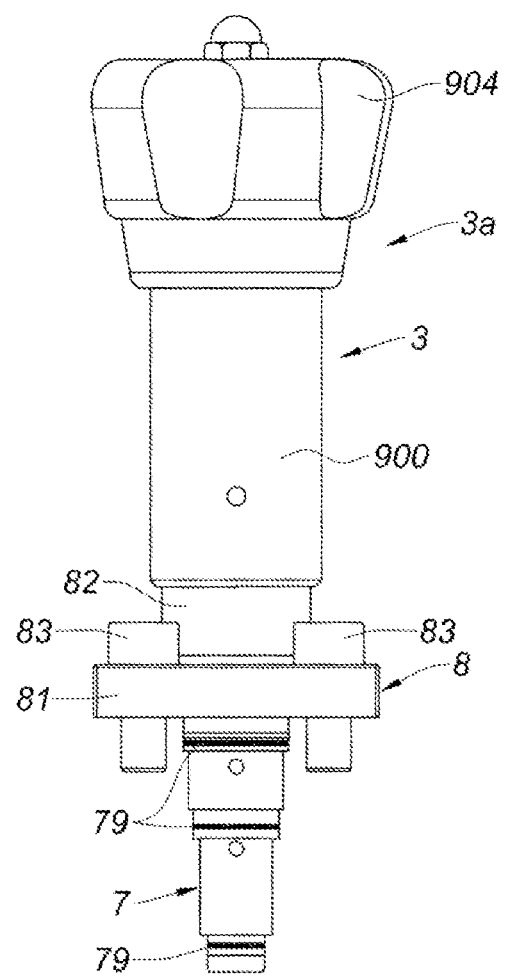
FIG. 12 is a side view of a distribution or regulation device of the pressure regulator type with a mechanical setting system according to the present disclosure.
Figure 13:
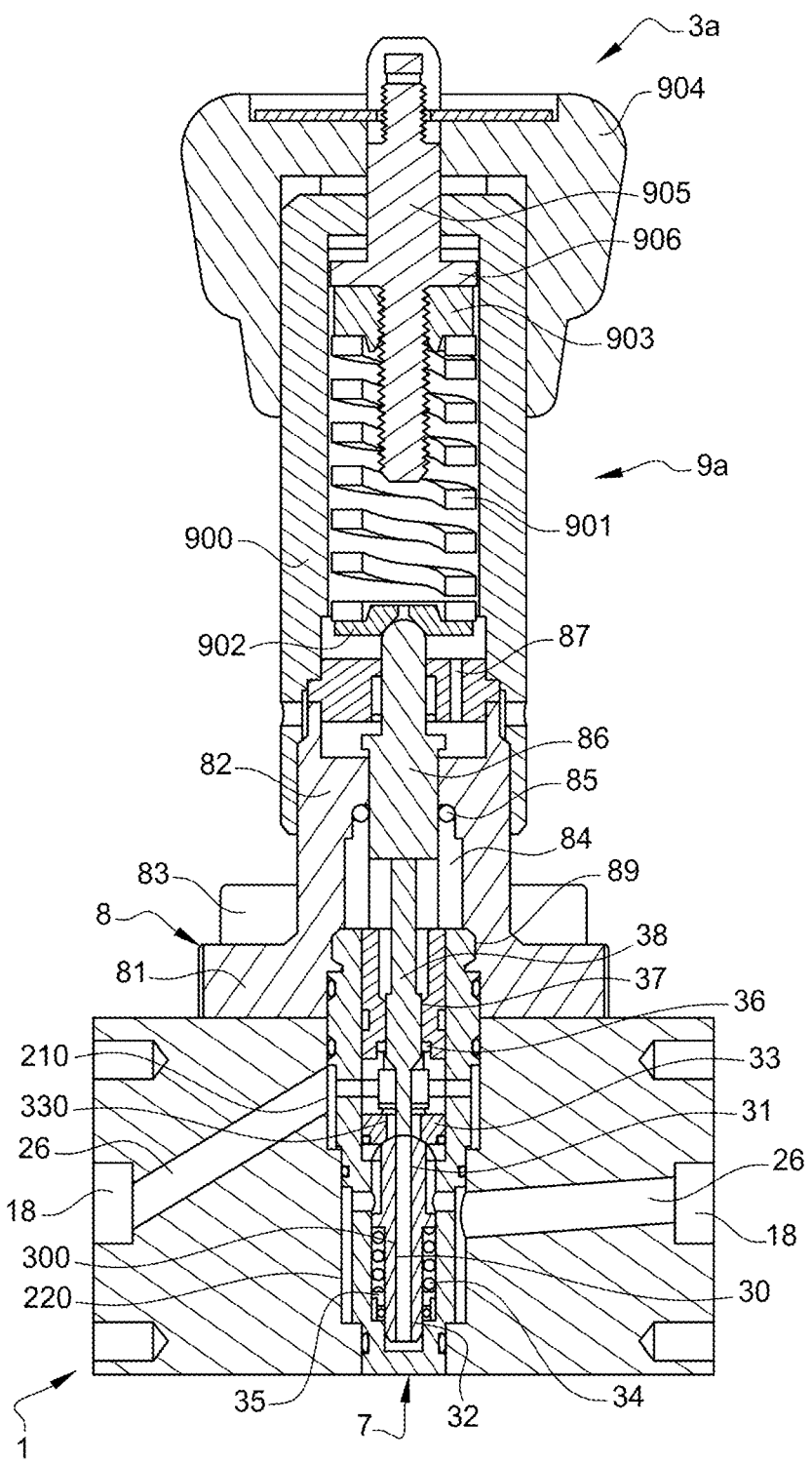
FIG. 13 is a cross-sectional view of the pressure regulator with a mechanical setting system of FIG. 12, in place in a module in accordance with FIG. 5.
Figure 14:
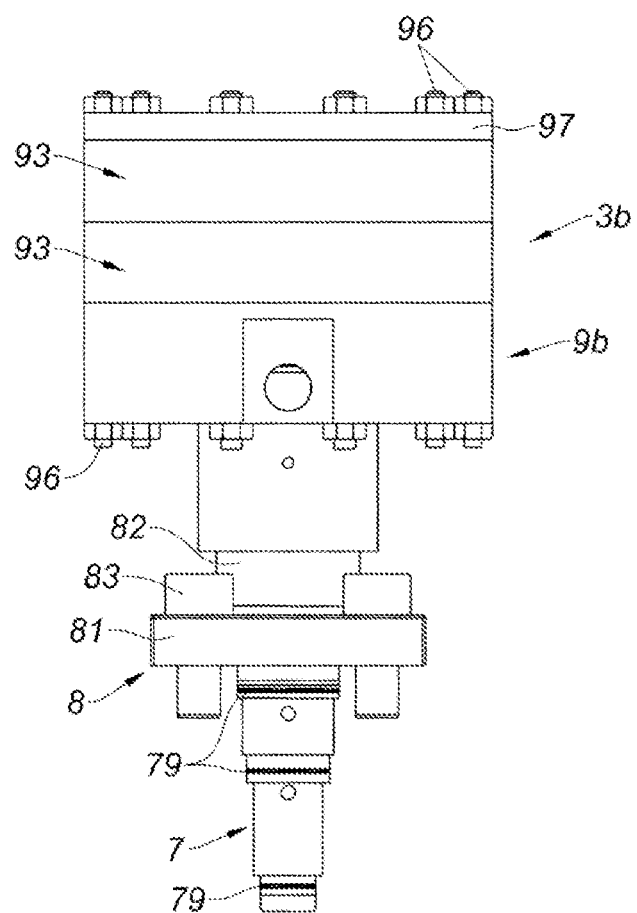
FIG. 14 is a side view of a distribution or regulation device of the pressure regulator type with a pneumatic setting system or dome-loaded according to the present disclosure.
Figure 15:
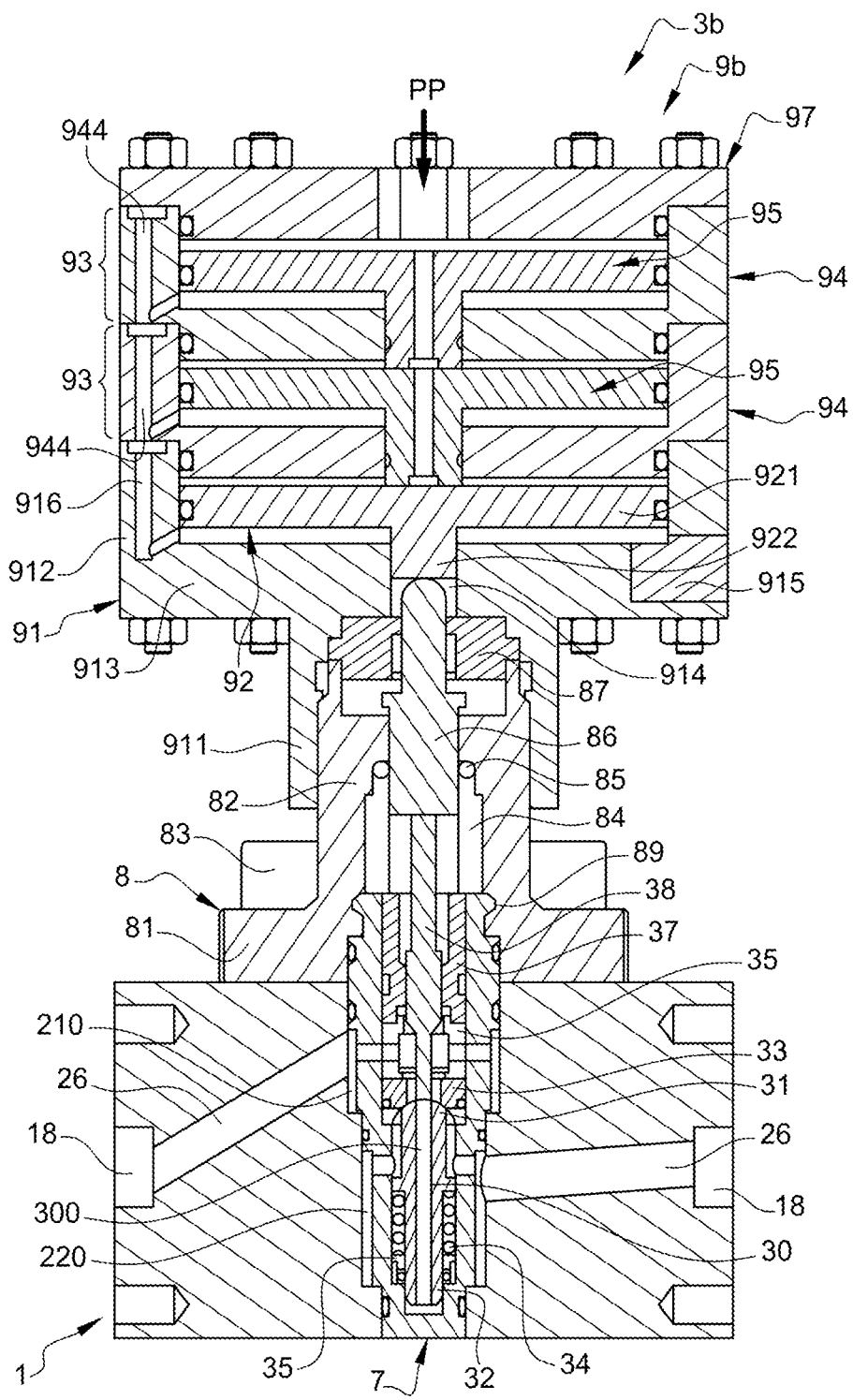
FIG. 15 is a cross-sectional view of the pressure regulator with a pneumatic setting system of FIG. 14, in place in a module in accordance with FIG. 5.
Figure 16:
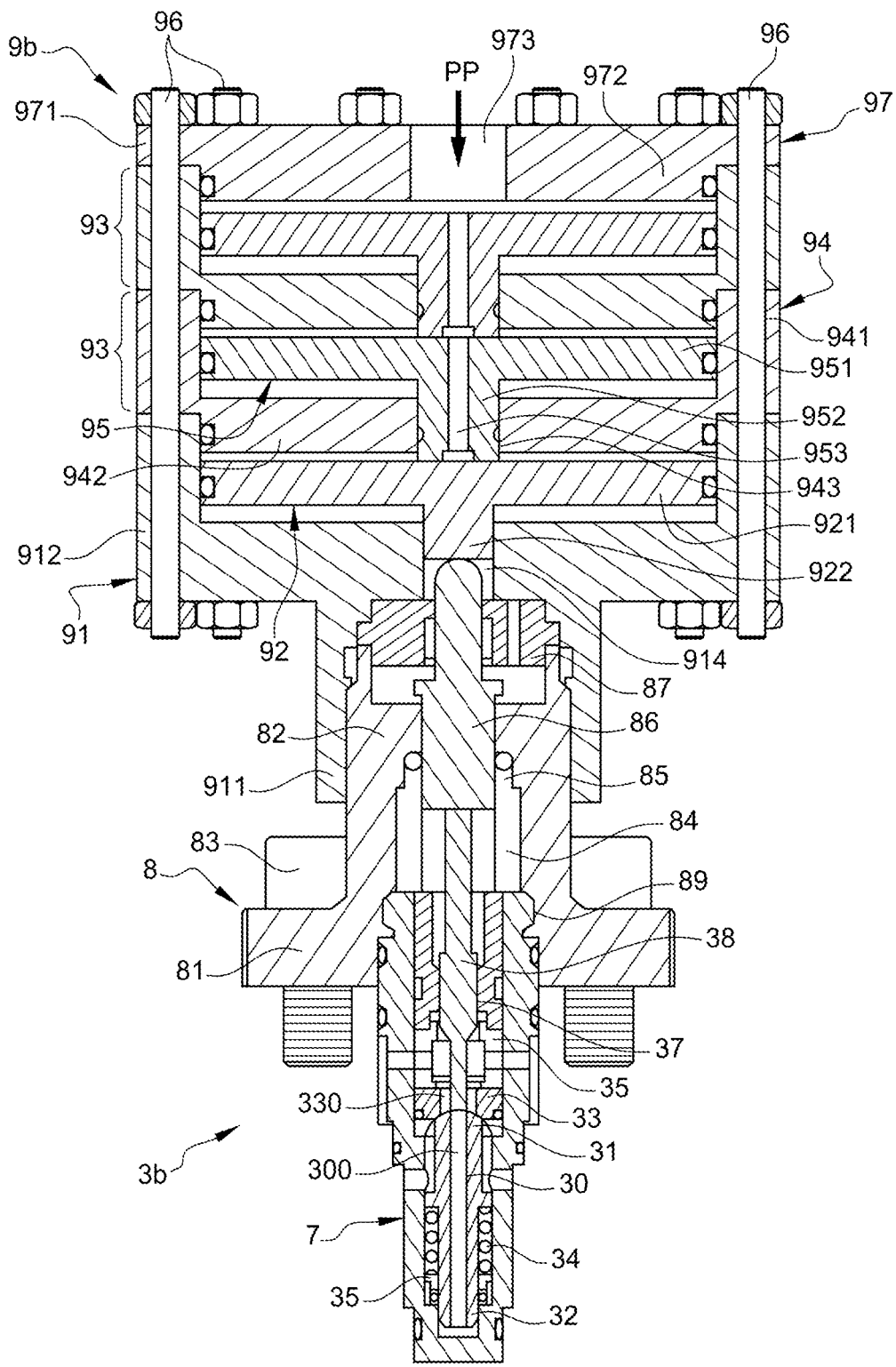
FIG. 16 is a cross-sectional view of the pressure regulator with a pneumatic setting system of FIG. 14, alone and according to a sectional plane different from that of FIG. 15.
Figure 17:
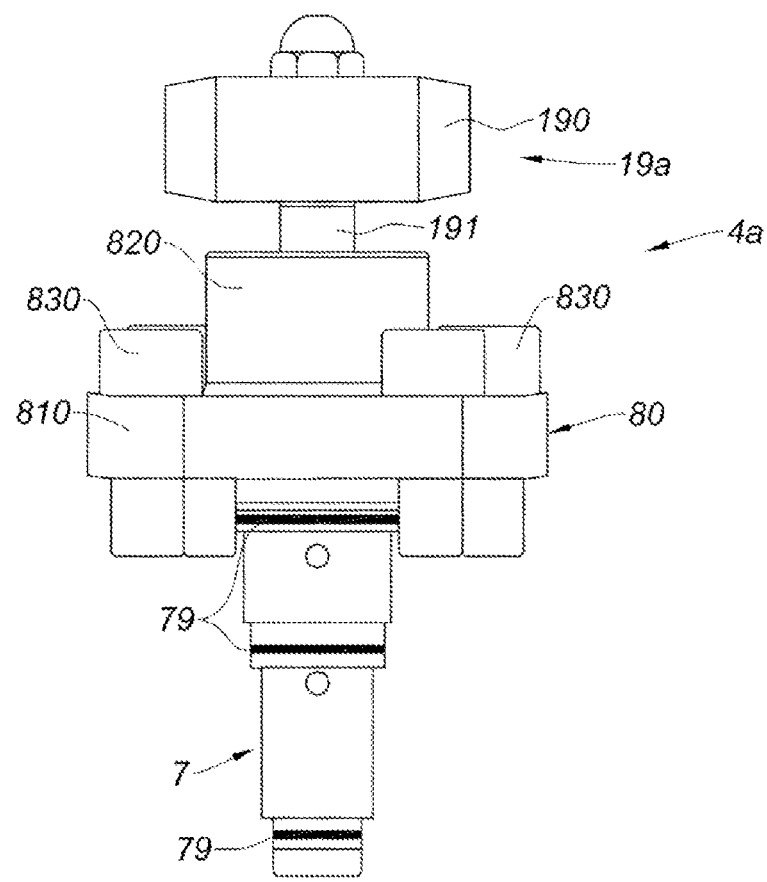
FIG. 17 is a side view of a distribution or regulation device of the block valve type with a manual actuator according to the present disclosure.
Figure 18:
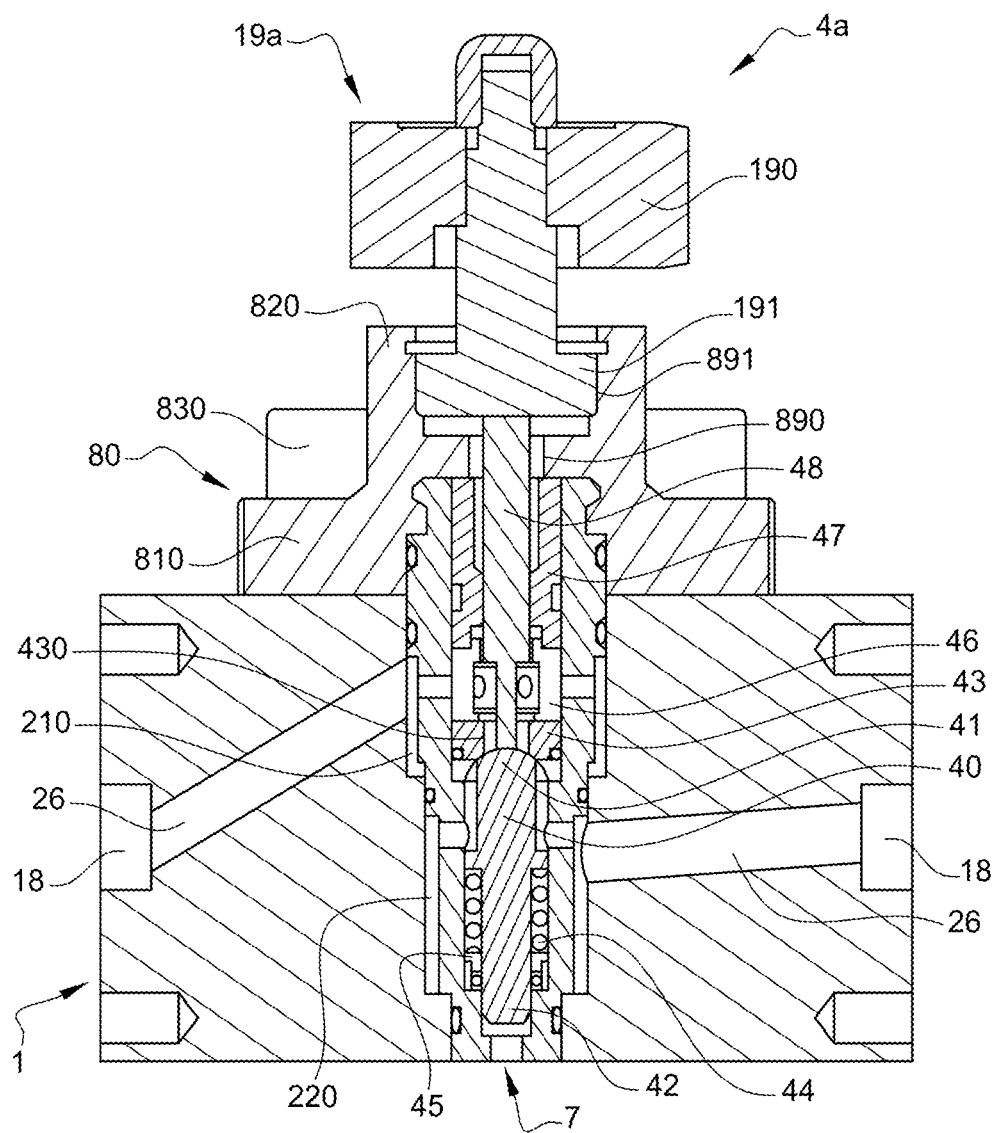
FIG. 18 is a cross-sectional view of the block valve with a manual actuator of FIG. 17, in place in a module in accordance with FIG. 5.
Figure 19:
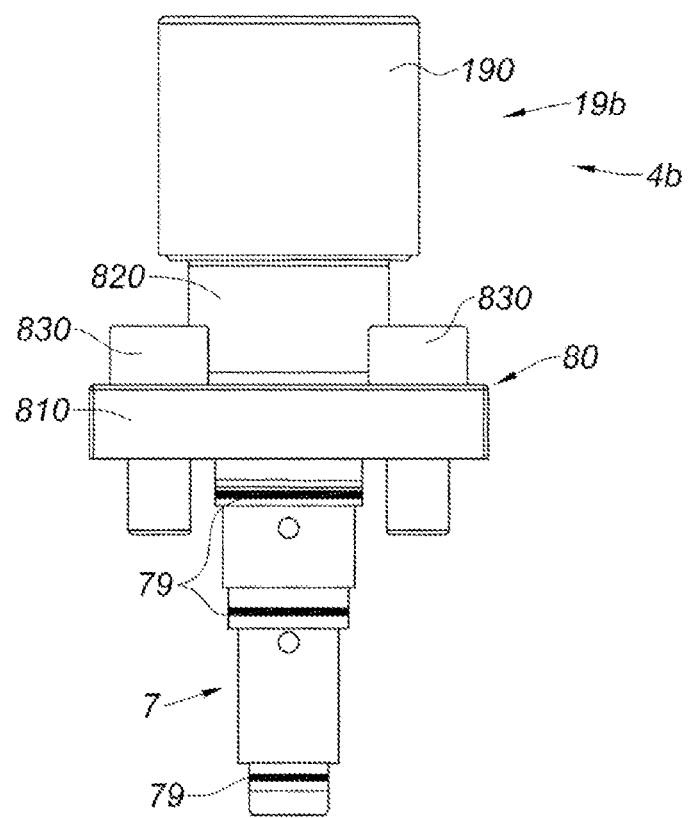
FIG. 19 is a side view of a distribution or regulation device of the block valve type with a pneumatic actuator according to the present disclosure.
Figure 20:
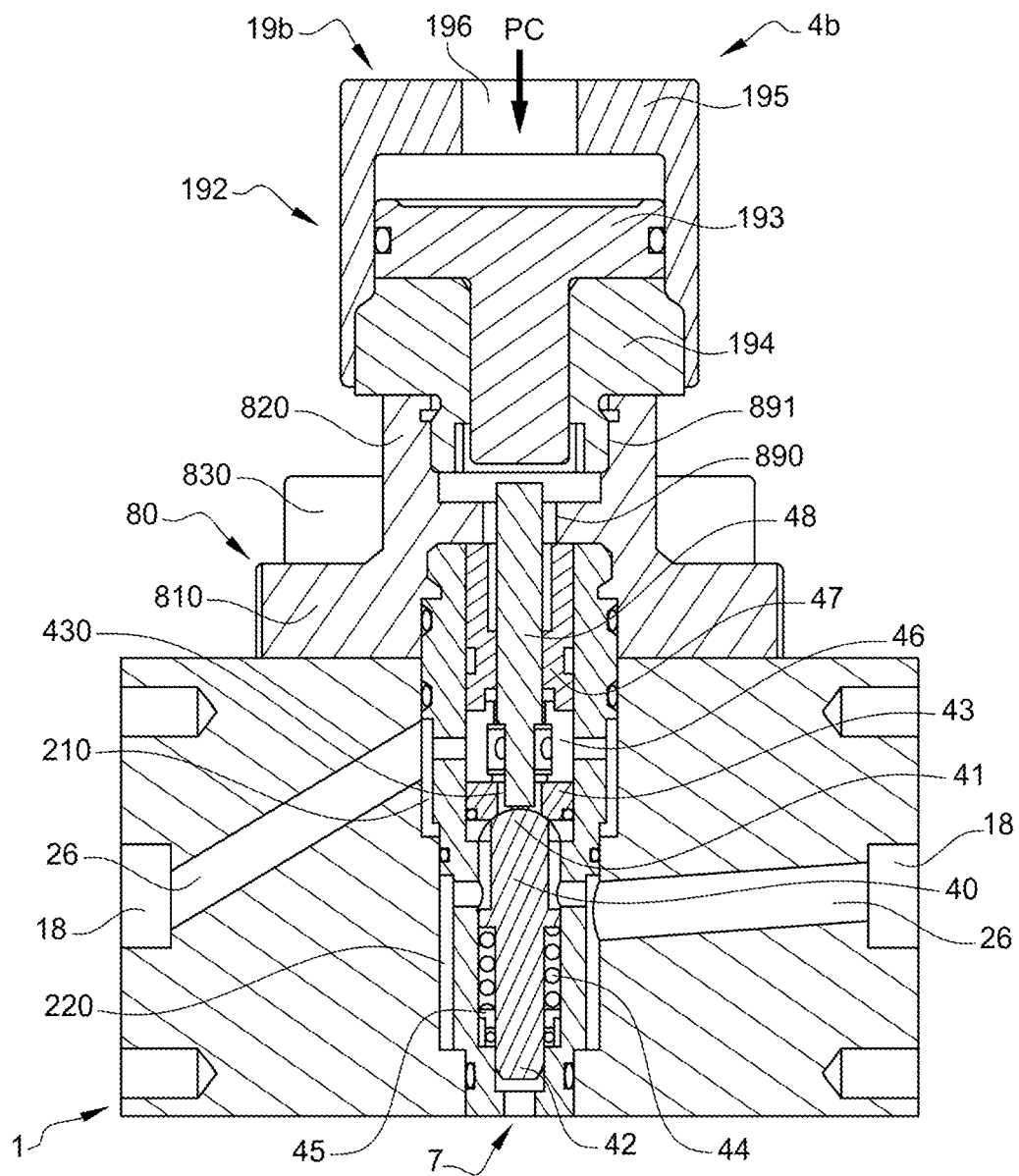
FIG. 20 is a cross-sectional view of the block valve with a pneumatic actuator of FIG. 19, in place in a module in accordance with FIG. 5.
Figure 21:
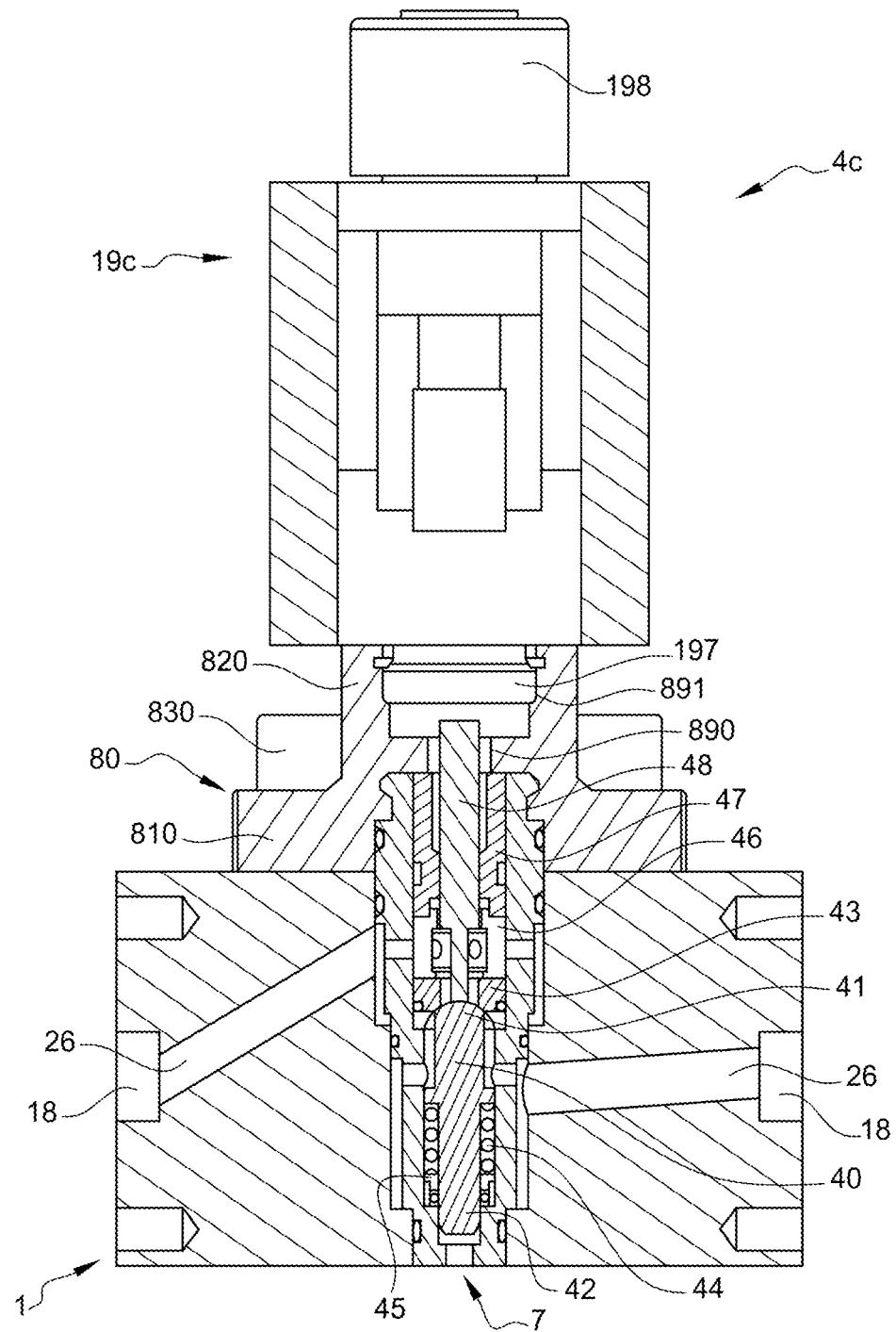
FIG. 21 is a cross-sectional view of a distribution or regulation device of the block valve type with an electric actuator, in place in a module in accordance with FIG. 5.
Figure 23:
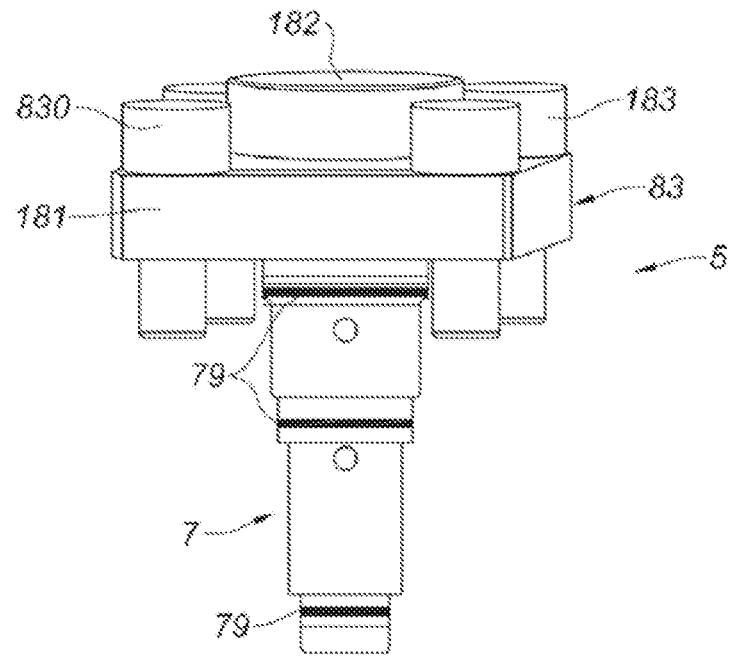
FIG. 23 is a side view of a distribution or regulation device of the anti-backflow isolation device type according to the present disclosure.
Figure 24:
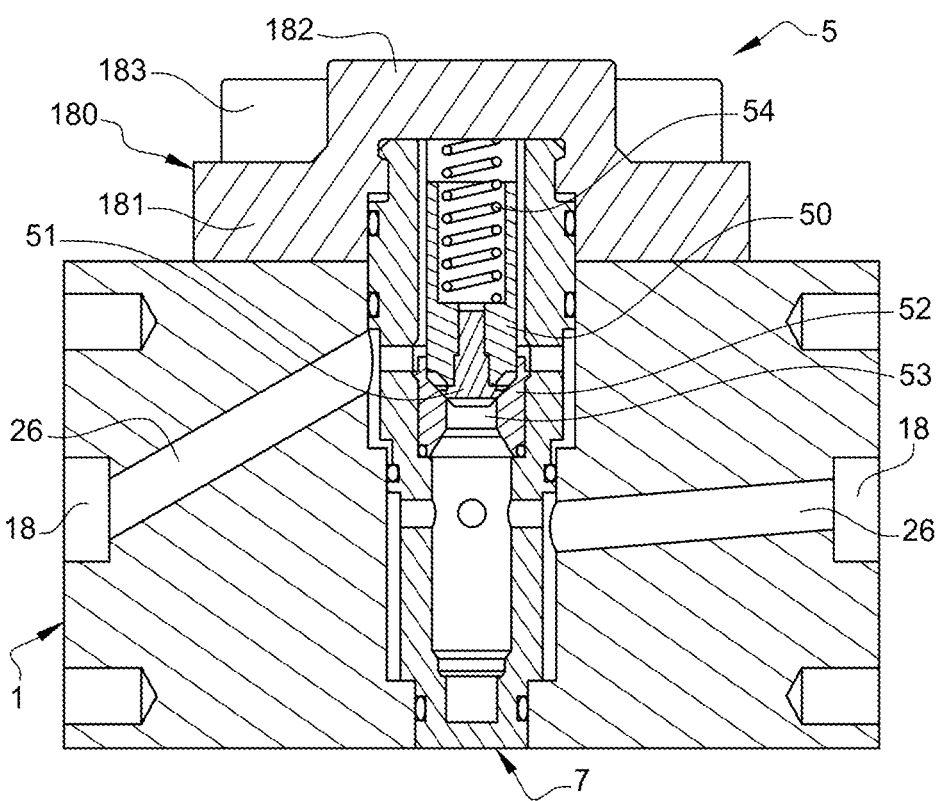
FIG. 24 is a cross-sectional view of the anti-backflow isolation device of FIG. 22, in place in a module in accordance with FIG. 5.
Figure 25:
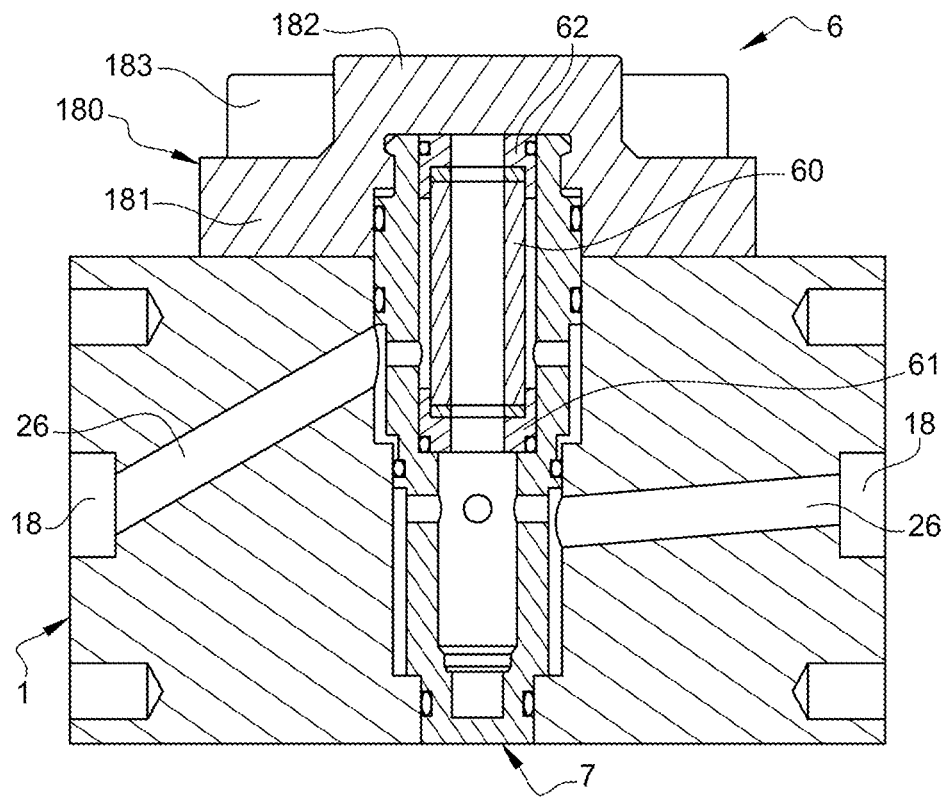
FIG. 25 is a cross-sectional view of a distribution or regulation device of the filtering device type, in place in a module in accordance with FIG. 5.

The following seven examples of a distribution or regulation device 3a, 3b, 4a, 4b, 4c, 5, 6 will be described:

a pressure regulator with a mechanical setting 3a illustrated in FIGS. 12 and 13;

a pressure regulator with a pneumatic setting 3b (or dome-loaded pressure regulator) illustrated in FIGS. 14 to 16;

a block valve with a manual actuator 4a illustrated in FIGS. 17 and 18;

a block valve with a pneumatic actuator 4b illustrated in FIGS. 19 and 20;

a block valve with an electric actuator 4c (or solenoid-valve) illustrated in FIG. 21;

an anti-backflow isolation device 5 illustrated in FIGS. 23 and 24; and a filtering device 6 illustrated in FIG. 25.

Figure 9:
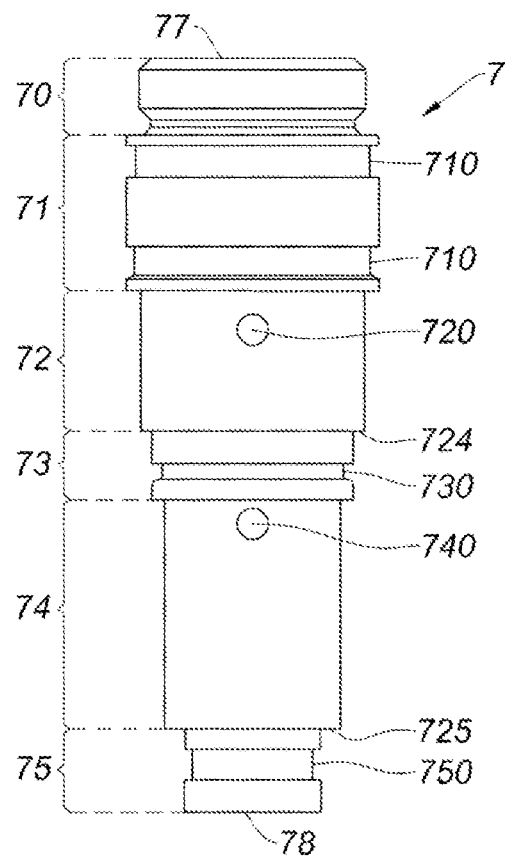
FIG. 9 is a side view of a cartridge for a distribution or regulation device adapted to a distribution and regulation kit or system according to the present disclosure.
Figure 10:
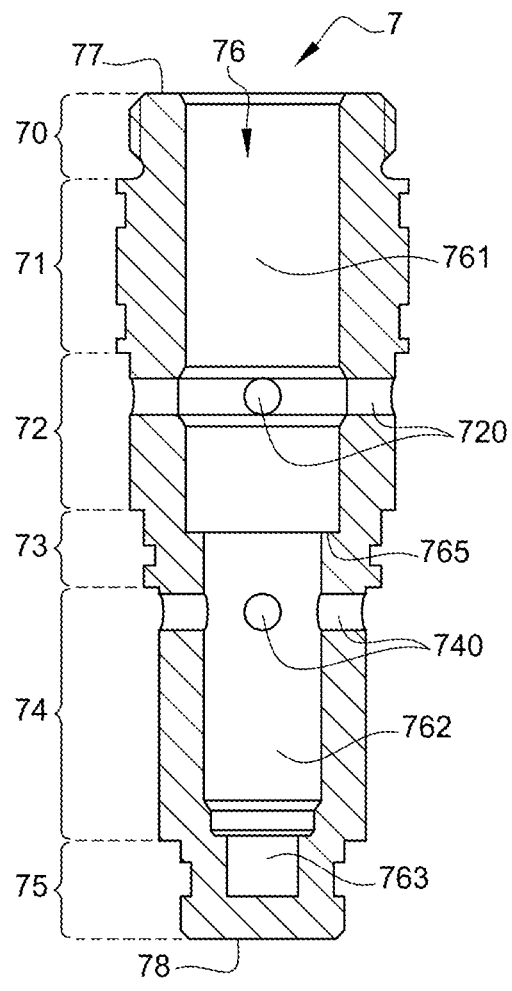
FIG. 10 is a cross-sectional view of one form of the cartridge of FIG. 9 in which the lower orifice does not open outwards.
Figure 11:
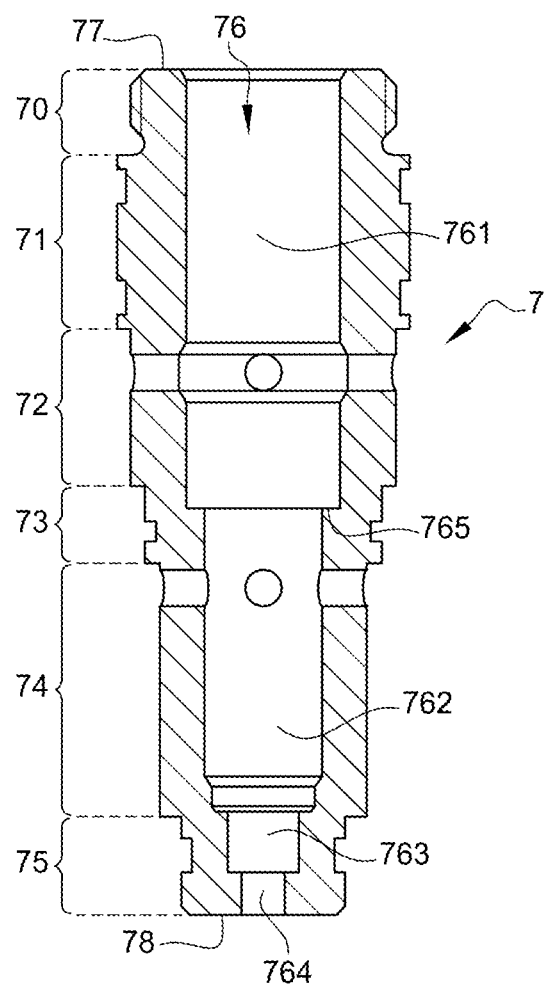
FIG. 11 is a cross-sectional view of another form the cartridge of FIG. 9 with the lower orifice opening outwards.

Referring to FIGS. 9-11, each distribution or regulation device 3a, 3b, 4a, 4b, 4c, 5, 6 comprises a cartridge 7 formed by a tubular body adapted to be received inside an inner chamber 2 of any of the modules 1. The cartridge 7 is universal to the extent that it is similar in all of the distribution or regulation devices 3a, 3b, 4a, 4b, 4c, 5, 6, with the exception of one single difference regarding the through or not-through nature of a lower orifice (described in greater detail below).

The cartridge 7 successively comprises:

an upper fitting 70 having an outer tapping in order to enable fastening to the bracket (described in greater detail below) on the cartridge 7;

a cylindrical and smooth first upper sleeve 71, having two peripheral grooves 710 adapted to receive O-ring gaskets 79, and having an external diameter substantially equivalent to the internal diameter D1 of the upper bore 21, and more specifically smaller than the internal diameter D1 by a predefined mounting clearance in order to be able to be mounted in an adjusted and tight manner in the upper bore 21;

a cylindrical and smooth second upper sleeve 72, having an external diameter which is, on the one hand, smaller than the internal diameter D1 of the upper bore 21 and the external diameter of the first upper sleeve 71 and, on the other hand, larger than the internal diameter D2 of the intermediate bore 22, wherein the second upper sleeve 72 has upper through holes 720 opening into an upper chamber 761 delimited at least partially by the second upper sleeve 72;

a cylindrical and smooth first intermediate sleeve 73, having a peripheral groove 730 adapted to receive an O-ring gasket 79, and having an external diameter which is smaller than the external diameter of the second upper sleeve 72 and which is also substantially equivalent to the internal diameter D2 of the intermediate bore 22, and more specifically smaller than the internal diameter D2 by a predefined mounting clearance in order to be able to be mounted in an adjusted and tight manner in the intermediate bore 22;

a cylindrical and smooth second intermediate sleeve 74, having an external diameter which is, on the one hand, smaller than the internal diameter D2 of the intermediate bore 22 and the external diameter of the first intermediate sleeve 73 and, on the other hand, larger than the internal diameter D3 of the lower bore 23, wherein the second intermediate sleeve 74 has intermediate through holes 740 opening into an intermediate chamber 762 delimited at least partially by the second intermediate sleeve 74; and a cylindrical and smooth lower sleeve 75 having a peripheral groove 750 adapted to receive an O-ring gasket 79, and having an external diameter which is smaller than the external diameter of the second intermediate sleeve 74 and which is also substantially equivalent to the internal diameter D3 of the lower bore 23, and more specifically smaller than the internal diameter D3 by a predefined mounting clearance in order to be able to be mounted in an adjusted and tight manner in the lower bore 23.

Thus, the cartridge 7 has:

an upper outer shoulder 724 between the second upper sleeve 71 and the first intermediate sleeve 73; and a lower outer shoulder 725 between the second intermediate sleeve 74 and the lower sleeve 75.

The cartridge 7 has two opposite ends, namely an upper end 77 located on the upper fitting 70, and a lower end 78 located on the lower sleeve 75.

The cartridge 7 has thereinside an inner cavity 76 successively comprising:

the cylindrical and smooth upper chamber 761 opening into the upper end 77 and extending substantially up to the first intermediate sleeve 73;

the cylindrical and smooth intermediate chamber 762, having an internal diameter which is smaller than the internal diameter of the upper chamber 761 and extending substantially up to the lower sleeve 75; and a cylindrical and smooth internal orifice 763, formed in the lower sleeve 75 and having an internal diameter which is smaller than the internal diameter of the intermediate chamber 762.

In the example of FIG. 10, the internal orifice 763 does not open outwards, to the extent that it does not open into the lower end 78 of the cartridge 7, so that the inner cavity 76 is blind.

In the example of FIG. 11, the internal orifice 763 opens outwards, to the extent that it opens into the lower end 78 of the cartridge 7 (via a channel 764), so that the inner cavity 76 crosses the cartridge 7 from the upper end 77 to the lower end 78.

The inner cavity 76 has an inner shoulder 765 between the upper chamber 761 and the intermediate chamber 762.

When in place, and as shown in FIGS. 13, 15, 17, 19, 20, 23 and 24, when the cartridge 7 is disposed and held in the inner chamber 2 of the module 1:

the lower sleeve 75 is mounted in an adjusted and tight manner (with its O-ring gasket 79) in the lower bore 23 and comes substantially flush with the lower face 14 of the module 1;

the lower outer shoulder 725 bears on the lower inner shoulder 25;

the second intermediate sleeve 74 extends in the intermediate bore 22, with an intermediate annular space 220 between the second intermediate sleeve 74 and the intermediate bore 22, the intermediate annular space 220 being in communication with the intermediate chamber 762 via the intermediate holes 740, bearing in mind that a drilling 26 opens into the intermediate annular space 220;

the first intermediate sleeve 73 is mounted in an adjusted and tight manner (with its O-ring gasket 79) in the intermediate bore 22;

the upper outer shoulder 724 extends opposite the upper inner shoulder 24 with a spacing corresponding to a mounting clearance;

the second upper sleeve 72 extends in the upper bore 21, with an upper annular space 210 between the second upper sleeve 72 and the upper bore 21, the upper annular space 210 being in communication with the upper chamber 761 via the upper holes 720, bearing in mind that a drilling 26 opens into the upper annular space 210;

the first upper sleeve 71 is mounted in an adjusted and tight manner (with its bottom O-ring gasket 79) in the upper bore 21;

the first upper sleeve 71 extends beyond the upper face 13 of the module 1 with the top O-ring gasket 79 is outside the module 1; and the upper fitting 70 extends beyond the upper face 13 of the module 1.

The following description concerns more specifically the pressure regulator with a mechanical setting 3a (FIGS. 12-13) and the pressure regulator with a pneumatic setting 3b (FIGS. 14-15) each comprising the following regulator members:

a piston 30 slidably mounted inside the second intermediate sleeve 74 in the intermediate chamber 762 forming an upstream chamber (and therefore connected to at least one inlet "E" of the module 1 via an appropriate drilling 26), wherein the piston 30 has an upper end forming a plunger 31 and a lower end 32 surrounded by an O-ring gasket and sliding inside the lower sleeve 75 in the lower orifice 763 which does not open outwards (FIG. 10);

a downstream body 33 mounted in a static and tight manner, by being surrounded by an O-ring gasket, inside the second upper sleeve 72, wherein the downstream body 33 separates the intermediate chamber 762 from the upper chamber 761 forming a downstream chamber (and therefore connected to at least one outlet "S" of the module 1 via an appropriate drilling 26), and wherein the downstream body 33 has a central hole 330 defining a seat forming a relief seat adapted to cooperate with the plunger 31;

an elastic biasing member 34 urging the piston 30 and the plunger 31 in the direction of a position of closing the communication between the intermediate chamber 762 and the upper chamber 761, opposite to a reduced pressure in the upper chamber 761 (or downstream chamber) which urges the piston 30 and the plunger 31 in the direction of a position of opening the communication between the intermediate chamber 762 and the upper chamber 761, wherein the elastic biasing member 34 is in the form of a spring which is compressed between an annular journal formed on the periphery of the piston 30 and a collar 35 fastened in the bottom of the intermediate chamber 762 on top of the O-ring gasket surrounding the lower end 32 of the piston 30;

a ring 36 mounted static in the upper chamber 761 and bearing on the downstream body 33, wherein the ring 36 has peripheral holes which coincide with the upper holes 720 of the second upper sleeve 72;

an upper plug 37 mounted in a static and tight manner, by being surrounded by an O-ring gasket, inside the first upper sleeve 71, wherein the upper plug 35 bears on the ring 36; and a tappet 38 crossing both the downstream body 33, the ring 36 and the upper plug 37, wherein the tappet 38 has a lower end adapted to exert a force on the plunger 31 in the direction of the opening position, and an upper end which extends beyond the upper end 77 of the cartridge 7.

Furthermore, the piston 30 has an inner through channel 300 having two opposite ends comprising:

an upper end open on the side of the downstream body 33 and forming a drain seat (to enable draining in case of overpressure on the downstream side), the tappet 38 being adapted to bear on the drain seat to plug it, and a lower end open into the lower orifice 763 of the lower sleeve 75.

In addition, each of the pressure regulators 3a and 3b comprises a hollow bracket 8 crossed by a central orifice 89 and having a tray 81 extended by a sleeve 82.

The tray 81 has a lower face adapted to bear on the upper face 13 of the module 1, and the tray 81 has peripheral holes which coincide with the threaded holes 20 formed in the upper face 13, so that the tray 81 of the bracket 8 is fastened by screwing on the upper face 13 via screws 83 screwed in the threaded holes 20. Thus, these peripheral holes in the tray 81 and these screws 83 form fastening elements for fastening the pressure regulator 3a or 3b on the upper face 13 of any of the modules 1.

The central orifice 89 has a lower portion successively comprising, starting from the lower face of the tray 81:

a smooth portion having an internal diameter substantially equivalent to the external diameter of the first upper sleeve 71, and more specifically larger than the external diameter by a predefined mounting clearance in order to be able to be mounted in an adjusted and tight manner around the portion of the first upper sleeve 71 which extends beyond the upper face 13 of the module 1 with the top O-ring gasket 79 which provides sealing; and a threaded portion which is screwed on the upper fitting 70.

A spacer 84 is wedged inside the central orifice 89 between the upper end 77 of the cartridge 7 and an annular journal provided inside the central orifice 89, and an O-ring gasket 85 is provided inside the central orifice 89 on top of the spacer 84.

The sleeve 82 has an upper end provided with an external tapping.

The bracket 8 also embeds a push piston 86 slidably mounted in an upper portion of the central orifice 89, wherein the push piston 86 is surrounded by the O-ring gasket 85 and slides inside the spacer 84 to present a lower end which bears on the tappet 38. The push piston 86 also crosses a lid 87 fastened on the upper end of the sleeve 82, the lid 87 thus blocking the push piston 86 in translation upwards. The push piston 86 has an upper end which extends beyond the lid 87.

Furthermore, each of the pressure regulators 3a and 3b comprises a setting system 9a, 9b mounted on the bracket 8 and acting on the push piston 86, and therefore on the tappet 38, to enable a setting of a force for opening the plunger 31 to relieve the pressure.

In the context of the pressure regulator with a mechanical setting 3a illustrated in FIGS. 12 and 13, the setting system is a mechanical setting system 9a which comprises:

a tubular support 900 externally fastened on the bracket 8 by being screwed on the external tapping of the upper end of the sleeve 82;

an elastic biasing member 901, in this instance a spring, compressed inside the support 900 between a lower journal 902 on which the push piston 86 bears and an upper journal 903 whose position is mechanically settable in order to enable a setting of the pushing force exerted by the elastic biasing member 901 on the push piston 86.

More specifically, the position setting of the upper journal 903 is performed via a knob 904 screwed on an upper end of the support 900 and acting on an axis 905 in order to displace it in translation, wherein the axis 905 has an annular journal 906 on which the upper journal 903 bears. Thus, by acting on the knob 904, the elastic biasing member 901 is substantially compressed between the lower journal 902 and the upper journal 903, and thus the force exerted on the push piston 86 is substantially raised.

In the context of the pressure regulator with a pneumatic setting 3b illustrated in FIGS. 14 to 16, the setting system is a pneumatic setting system 9b which comprises a tubular support 91 externally fastened on the bracket 8 by being screwed on the external tapping of the upper end of the sleeve 82, wherein the support 91 comprises:

a lower tubular portion 911 externally screwed on the external tapping of the upper end of the sleeve 82;

an upper tubular portion 912 enlarged in comparison with the lower portion 911, wherein the enlarged upper tubular portion 912 is provided with a peripheral wall internally delimiting a smooth cylindrical cavity; and an annular portion 913 connecting the lower tubular portion 911 to the upper tubular portion 912 and provided with a central hole 914.

Once the support 91 is fastened on the bracket 8, the push piston 86 is introduced inside the central hole 914, yet without completely crossing it.

The pneumatic setting system 9b further comprises a main piston 92 sliding inside the support 91, wherein the main piston 92 comprises:

an upper section 921 mounted in an adjusted and tight manner, by being surrounded by an O-ring gasket, inside the cylindrical cavity of the upper portion 912, wherein the upper section 921 provides an upper surface on which a pilot pressure PP acts; and a lower section 922 sliding inside the central hole 914 and bearing on the upper end of the push piston 86, wherein the lower section 922 provides a lower surface thus acting on the push piston 86, and wherein the lower surface has a surface area smaller than the upper surface.

Thus, the main piston 92 forms a solid piston, tightly and slidably mounted in the support 91 in order to act on the push piston 86, the main piston 92 being subjected to the pilot pressure PP source in order to enable a setting of the pushing force exerted by the main piston 92 on the push piston 86.

A vent 915 is formed in the support 91 in order to set the lower surface of the upper section 921 of the main piston 92 (opposite the annular wall 913) in communication with the outside ambient pressure.

In order to reduce the pilot pressure PP desired for setting the pushing force exerted by the main piston 92 on the push piston 86, it is interesting that the pneumatic setting system 9b has at least one secondary stage 93 described hereinbelow which allows introducing a reduction ratio while allowing for a reduced bulk.

In the example of FIGS. 14 to 16, the pneumatic setting system 9b comprises two secondary stages 93.

The first secondary stage 93 comprises a tubular secondary body 94 removably and tightly affixed on the support 91 and a secondary piston 93 tightly and slidably mounted inside the secondary body 94, wherein the secondary body 94 has:

an upper tubular portion 941 delimiting a cylindrical upper cavity, wherein the upper tubular portion 941 rests on the upper tubular portion 912 of the support 91 and is fastened thereon via several rods 96 crossing the upper tubular portions 912, 941 and bolted at both ends thereof; and a lower portion 942 crossed by a central hole 943 having a reduced internal diameter in comparison with the internal diameter of the upper cavity of the upper tubular portion 941.

The secondary piston 95 of the first secondary stage 93 has:

an upper section 951 providing an upper surface on which the pilot pressure PP acts and tightly mounted, by being surrounded by an O-ring gasket, inside the upper cavity of the upper tubular portion 941 of the secondary body 94; and a lower section 952 providing a lower surface bearing on the upper surface of the upper section 921 of the main piston 92, wherein the lower section 952 is tightly mounted, by being surrounded by an O-ring gasket, inside the central hole 943 of the lower portion 942 of the secondary body 94, and wherein the lower surface of the secondary piston 95 has a surface area smaller than the upper surface of the secondary piston 95.

Furthermore, the secondary piston 95 is provided with an inner through channel 953 opening into its lower surface and into its upper surface, so that the pilot pressure PP is applied on the upper surface of the upper section 921 of the main piston 92 and the pilot pressure PP further crosses the secondary piston 95 via the inner channel 953 in order to be also applied on the upper surface of the upper section 921 of the main piston 92.

At least one channel 916 is provided in the support 91 and at least one channel 94 is provided in the secondary body 94 to establish together a communication between the bottom of the upper section 921 of the main piston 92 (opposite the annular wall 913) which, as noted above, is at the outside ambient pressure due to the vent 915, and the bottom of the upper section 951 of the secondary piston 95 (opposite the lower portion 942).

With the first secondary stage 93, the pilot pressure PP allows applying a resulting force on the push piston 86 which corresponds to the sum of the following two forces:

the pressing force of the main piston 92 which corresponds to the pilot pressure PP multiplied by the upper surface of the upper section 921 of the main piston 92; and the pressing force of the secondary piston 95 of the first secondary stage 93 which corresponds to the pilot pressure PP multiplied by the upper surface of the upper section 951 of the secondary piston 95.

As illustrated in FIGS. 14 to 16, it is possible to provide for a second secondary stage 93 which comprises similar members as the first secondary stage 93, namely:

a tubular secondary body 94 removably and tightly affixed on the secondary body 94 of the first secondary stage 93; and a secondary piston 95 tightly and slidably mounted inside the secondary body 94 of the second secondary stage 93. In some variations of the present disclosure, the second secondary stage 93 comprises the same members as the first secondary stage 93.

The secondary body 94 of the second secondary stage 93 rests on the upper tubular portion 941 of the secondary body 94 of the first secondary stage 93 and is fastened thereon via the same rods 96 crossing the upper tubular portions 941 of the two secondary bodies 94.

The secondary piston 95 of the second secondary stage 93 is also provided with an inner through channel 953 opening into its lower surface and into its upper surface, so that the pilot pressure PP is applied on the upper surface of the upper section 921 of the main piston 92 of the second secondary stage 93, and the pilot pressure PP further crosses the secondary piston 95 of the second secondary stage 93 via the inner channel 953 in order to be also applied on the upper surface of the upper section 951 of the secondary piston 95 of the first secondary stage 93.

Thus, with the second secondary stage 93, the pilot pressure PP allows applying a resulting force on the push piston 86 which corresponds to the sum of the following three forces:

the pressing force of the main piston 92;

the pressing force of the secondary piston 95 of the first secondary stage 93; and the pressing force of the secondary piston 95 of the second secondary stage 93 which corresponds to the pilot pressure PP multiplied by the upper surface of the upper section 951 of the secondary piston 95.

Thus, it is possible to stack the secondary stages 93, in order to be able to work with a pilot pressure PP.

The pneumatic setting system 9b further comprises a lid 97 which comprises:

an upper portion 971 which rests on the upper tubular portion 912 of the support 91 (if the pneumatic setting system 9b does not comprise any secondary stage 93) or on the upper tubular portion 941 of the secondary body 94 of the last secondary stage 93 (namely the first secondary stage if there is only but one, or the second secondary stage 93 if there are two, or the third secondary stage 93 if there are three, etc.), and is fastened to the upper tubular portion 912 or 941 via the same rods 96, the bolts at the top bearing on the top of the upper portion 971 and the bolts at the bottom bearing on the bottom of the annular wall 913 of the support 91; and a lower portion 972 which is tightly mounted, by being surrounded by an O-ring gasket, inside the cylindrical cavity of the upper tubular portion 912 of the support 1 (if the pneumatic setting system 9b does not comprise any secondary stage 93) or inside the cylindrical upper cavity of the upper tubular portion 941 of the secondary body 94 of the last secondary stage 93 (if the pneumatic setting system 9b comprises at least one secondary stage 93).

The lid 97 is crossed by a central orifice 973 on which the pilot pressure PP source is connected.

It should be noted that the mechanical setting system 9a and the pneumatic setting system 9b are interchangeable because both of them are adapted to be removably mounted, by screwing on the external tapping of the upper end of the sleeve 82, and to act on the push piston 86.

The following description concerns more specifically the block valve with a manual actuator 4a, the block valve with a pneumatic actuator 4b and the block valve with an electric actuator 4c, each comprising the following regulator members:

a piston 40 slidably mounted inside the second intermediate sleeve 74 in the intermediate chamber 762 forming an upstream chamber (and therefore connected to at least one inlet "E" of the module 1 via an appropriate drilling 26), wherein the piston 40 has an upper end forming a plunger 41 and a lower end 42 surrounded by an O-ring gasket and sliding inside the lower sleeve 75 in the lower orifice 763 which opens outwards (FIG. 11), so that the piston 40 is subjected to the outside ambient pressure;

a downstream body 43 mounted in a static and tight manner, by being surrounded by an O-ring gasket, inside the second upper sleeve 72, wherein the downstream body 43 separates the intermediate chamber 762 of the upper chamber 761 forming a downstream chamber (and therefore connected to at least one outlet "S" of the module 1 via an appropriate drilling 26), and wherein the downstream body 43 has a central hole 430 defining a seat forming a relief seat adapted to cooperate with the plunger 41;

an elastic biasing member 44 urging the piston 40 and the plunger 41 in the direction of a position of closing the communication between the intermediate chamber 762 and the upper chamber 761, wherein the elastic biasing member 44 is in the form of a spring which is compressed between an annular journal formed on the periphery of the piston 40 and a collar 45 fastened in the bottom of the intermediate chamber 762 on the top of the O-ring gasket surrounding the lower end 42 of the piston 40;

a ring 46 mounted static in the upper chamber 761 and bearing on the downstream body 43, wherein the ring 46 as peripheral holes which coincide with the upper holes 720 of the second upper sleeve 72;

an upper plug 47 mounted in a static and tight manner, by being surrounded by an O-ring gasket, inside the first upper sleeve 71, wherein the upper plug 45 bears on the ring 46; and a tappet 48 crossing both the downstream body 43, the ring 46 and the upper plug 47, wherein the tappet 48 has a lower end adapted to exert a force on the plunger 41 in the direction of a position of opening the communication between the intermediate chamber 762 and the upper chamber 761, and an upper end which extends beyond the upper end 77 of the cartridge 7.

In addition, each of the block valves 4a, 4b, 4c comprises a hollow bracket 80 crossed by a central orifice 890 and having a tray 810 extended by a sleeve 820.

The tray 810 has a lower face adapted to bear on the upper face 13 of the module 1, and the tray 810 has peripheral holes which coincide with the threaded holes 20 formed in the upper face 13, so that the tray 810 of the bracket 80 is fastened by screwing on the upper face 13 via screws 830 screwed in the threaded holes 20.

Thus, these peripheral holes in the tray 810 and these screws 830 form fastening elements for fastening the block valve 4a, 4b or 4c on the upper face 13 of any of the modules 1.

The central orifice 890 has a lower portion successively comprising, starting from the lower face of the tray 810:

a smooth portion having an internal diameter substantially equivalent to the external diameter of the first upper sleeve 71, and more specifically larger than the external diameter by a predefined mounting clearance in order to be able to be mounted in an adjusted and tight manner around the portion of the first upper sleeve 71 which extends beyond the upper face 13 of the module 1 with the O-ring gasket 79 on the top which provides sealing; and a threaded portion which is screwed on the upper fitting 70.

The central orifice 890 has an upper portion provided with a threaded orifice 891, and the tappet 48 opens into the upper portion.

Furthermore, each of the block valves 4a, 4b, 4c comprises an actuator 19a, 19b, 19c mounted on the bracket 80 and acting on the tappet 48 to control the relative position of the plunger 41 with respect to the seat 430 between the closure position and the opening position, in other words to control the opening/closure of the gaseous flow between the or each inlet "E" of the module 1 and the or each outlet "S" of the module 1.

In the context of the block valve with a manual actuator 4a illustrated in FIGS. 17 and 18, the actuator is a manual actuator 19a which comprises a knob 190 secured to a push member 191 provided with a threaded portion which is screwed in the threaded orifice 891 of the central orifice 890 of the bracket 80, wherein the threaded portion of the push member 191 bears on the tappet 48.

Thus, by acting on the tap 190, the push member 191 is displaced in translation (by screwing/unscrewing) and thus acts on the tappet 48 to open/close the block valve with a manual actuator 4a.

In the context of the block valve with a pneumatic actuator 4b illustrated in FIGS. 19 and 20, the actuator is a pneumatic actuator 19b which comprises a support 192 fastened on the bracket 80 and crossed by a push piston 193 adapted to bear on the tappet under the action of a control pressure PC source.

The support 192 comprises a socket 194 which is screwed in the threaded orifice 891 of the central orifice 890 of the bracket 80, and further comprises a hollow body 195 which is fastened, in particular by screwing, on the socket 194. The push piston 193 is slidably and tightly mounted, by being surrounded by an O-ring gasket, inside the hollow body 195, wherein the hollow body 195 is provided with a central orifice 196 on which the control pressure PC source is connected.

The push piston 193 has a rod crossing the socket 194 to bear on the tappet 48 when a defined control pressure PC is applied on the push piston 193. Thus, by applying a control pressure PC, the push piston 193 is displaced in translation and thus acts on the tappet 48 to open/close the block valve with a pneumatic actuator 4b.

In the context of the block valve with an electric actuator 4c illustrated in FIG. 21, the actuator is an electric actuator 19c which comprises a support 197 which is screwed in the threaded orifice 891 of the central orifice 890 of the bracket 80, and which is crossed by a push member (not illustrated) adapted to bear on the tappet 48 under the action of an electric motor 198 which controls the translation of the push member. Thus, by controlling the electric motor 198, the push member is displaced in translation and thus acts on the tappet 48 to open/close the block valve with an electric actuator 4*c*.

Figure 22:
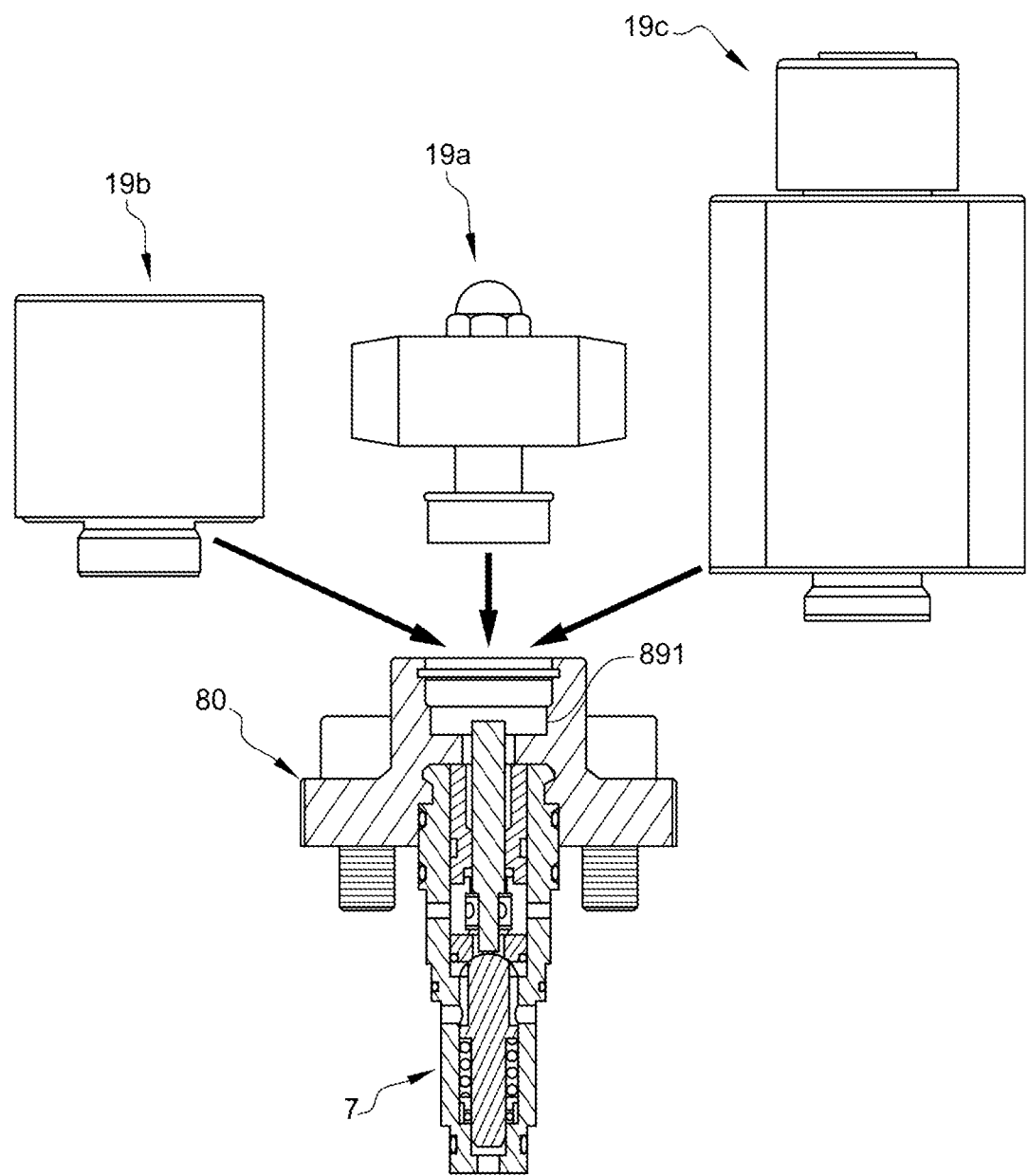
FIG. 22 is a view illustrating the interchangeability of the manual, pneumatic and electric actuators for the block valves of FIGS. 17 to 21.

As schematized in FIG. 22, it should be noted that the manual actuator 19*a*, the pneumatic actuator 19*b* and the electric actuator 19*c* are interchangeable because all three are adapted to be removably mounted, by screwing in the threaded orifice 891 of the central orifice 890 of the bracket 80, and to act on the tappet 48.

The following description concerns more specifically the anti-backflow isolation device 5 which fills the function of an anti-backflow plunger and which comprises the following members:

a piston 50 slidably mounted inside the first upper sleeve 71 in the upper chamber 761 forming a downstream chamber (and therefore connected to at least one outlet "S" of the module 1 via an appropriate drilling 26), wherein the piston 50 has a lower end forming a plunger 51 (or anti-backflow plunger);

a downstream body 52 mounted in a static and tight manner, by being surrounded by an O-ring gasket, inside the second upper sleeve 72, wherein the downstream body 52 abuts on the inner shoulder 765 and below the upper holes 720, wherein the downstream body 52 separates the upper chamber 761 from the intermediate chamber 762 forming an upstream chamber (and therefore connected to at least one inlet "E" of the module 1 via an appropriate drilling 26), and wherein the downstream body 52 has a central hole 53 defining a seat cooperating with the plunger 51 subjected to the pressure of the gas in the intermediate chamber 762 in the direction of detachment with respect to the seat 53; and an elastic biasing member 54 urging the piston 50 and the plunger 51 against the downstream body 52 in the direction of a position of closing the communication between the upper chamber 761 from the intermediate chamber 762.

In addition, the anti-backflow isolation device 5 further comprises a bracket 180 forming a closed lid and comprising a subplate 181 secured to a solid cap 182. The subplate 181 has peripheral holes which coincide with the threaded holes 20 formed in the upper face 13, so that the subplate 181 of the bracket 180 is fastened by screwing on the upper face 13 via screws 183 screwed in the threaded holes 20. Thus, these peripheral holes in the tray 181 and these screws 183 form fastening elements for fastening the anti-backflow isolation device 5 on the upper face 13 of any of the modules 1.

The elastic biasing member 54, which is a spring, is compressed between the cap 182 of the bracket 180 and the piston 50.

Thus, the anti-backflow isolation device 5 enables the circulation of the gas from the inlet (or from the intermediate chamber 762 forming an upstream chamber) towards the outlet (or towards the upper chamber 761 forming a downstream chamber) when the inlet pressure reaches a pressure sufficient to detach the plunger 51 from the seat 53 against the opposite force exerted by the elastic biasing member 54 whose calibration allows setting the pressure. Conversely, the anti-backflow isolation device 5 inhibits the circulation of the gas from the outlet towards the inlet.

The following description concerns more specifically the filtering device 6 which fills the function of filtering the gas circulating inside the filtering device 6 and which comprises a filter cartridge 60 received inside the upper chamber 761 and having an inlet opening into the intermediate chamber 762.

In addition, the filtering device 6 further comprises a bracket 180 forming a closed lid and similar to the bracket 180 of the above-described anti-backflow isolation device 5.

The filter cartridge 60 is wedged between a lower support 61 and an upper support 62 placed in the upper chamber 761.

The lower support 61 is mounted in a static and tight manner, by being surrounded by an O-ring gasket, inside the second upper sleeve 72, wherein the lower support 61 abuts on the inner shoulder 762 and below the upper holes 720.

The upper support 62 is mounted in a static and tight manner, by being surrounded by an O-ring gasket, inside the upper fitting 70, wherein the upper support 62 abuts against the cap 182 of the bracket 180.

Figure 26:
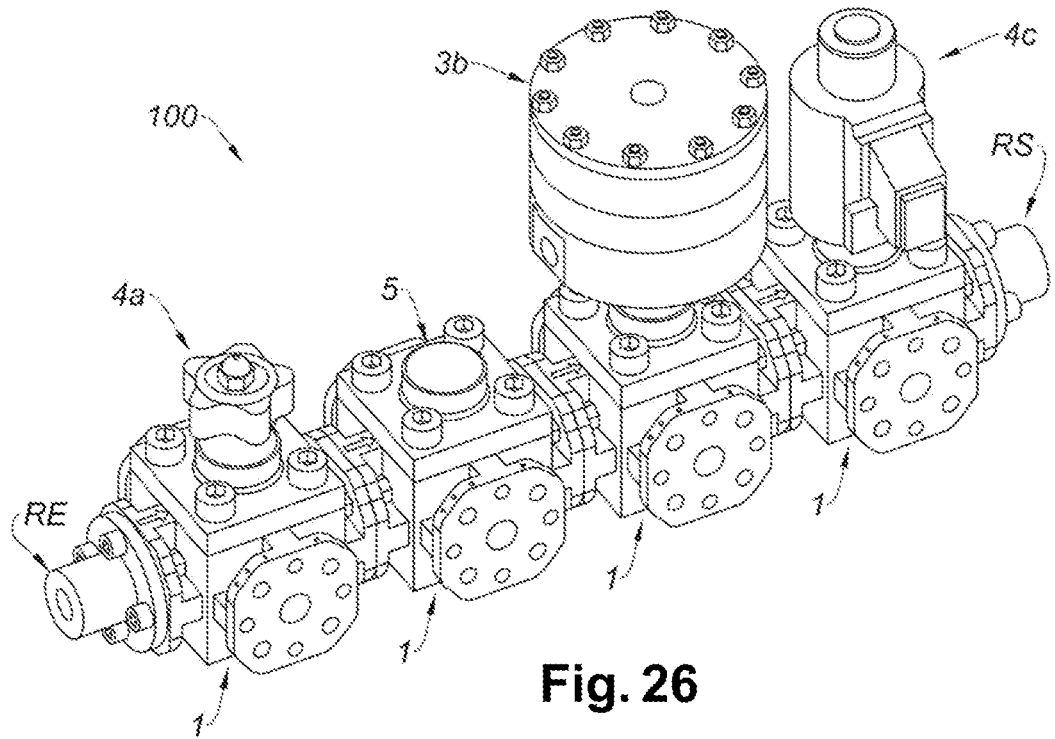
FIGS. 26 to 28 are perspective views of three forms of distribution and regulation systems incorporating modules according to FIGS. 1 to 5 and distribution or regulation devices according to FIGS. 12 to 25, as well as collectors in the examples of FIGS. 27 and 28.
Figure 27:
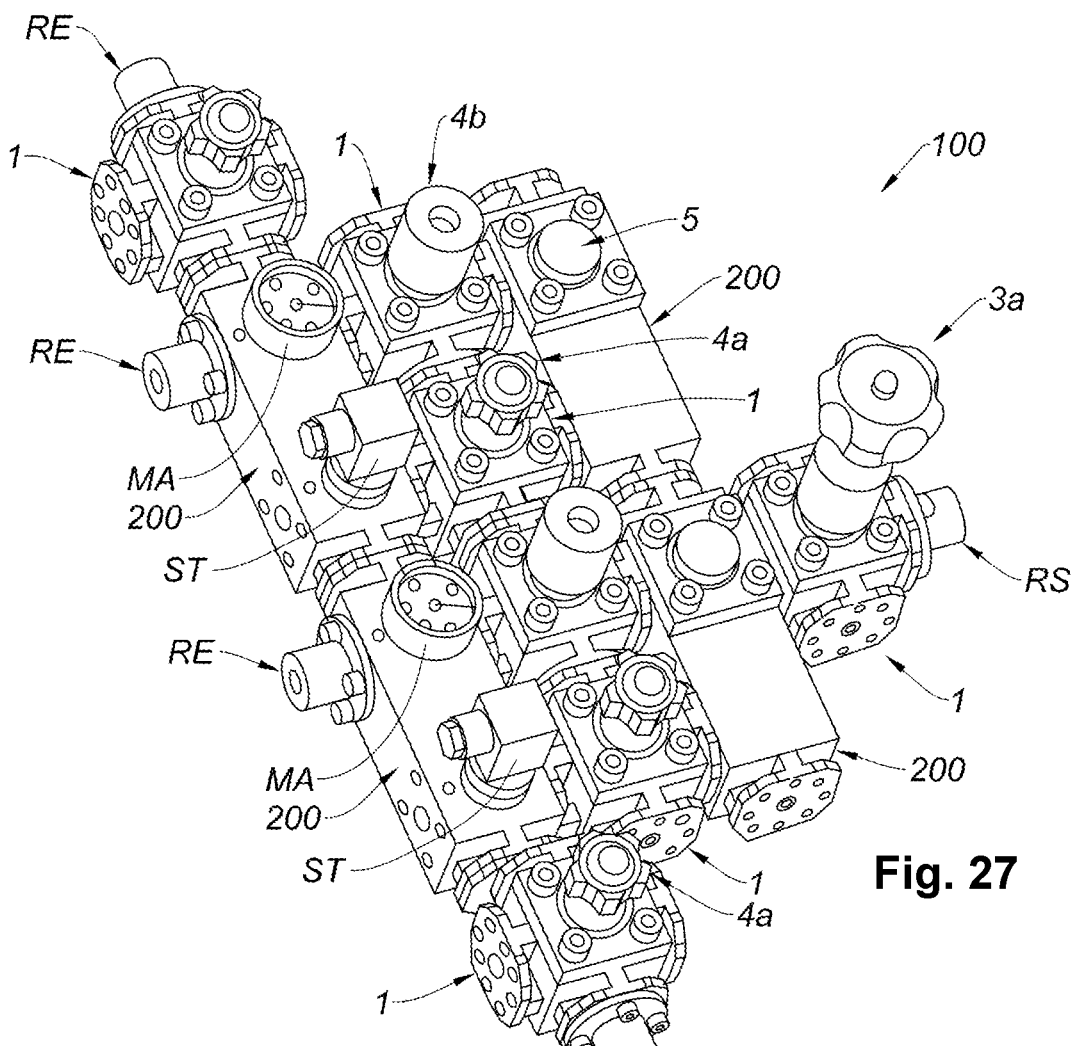
Figure 29:
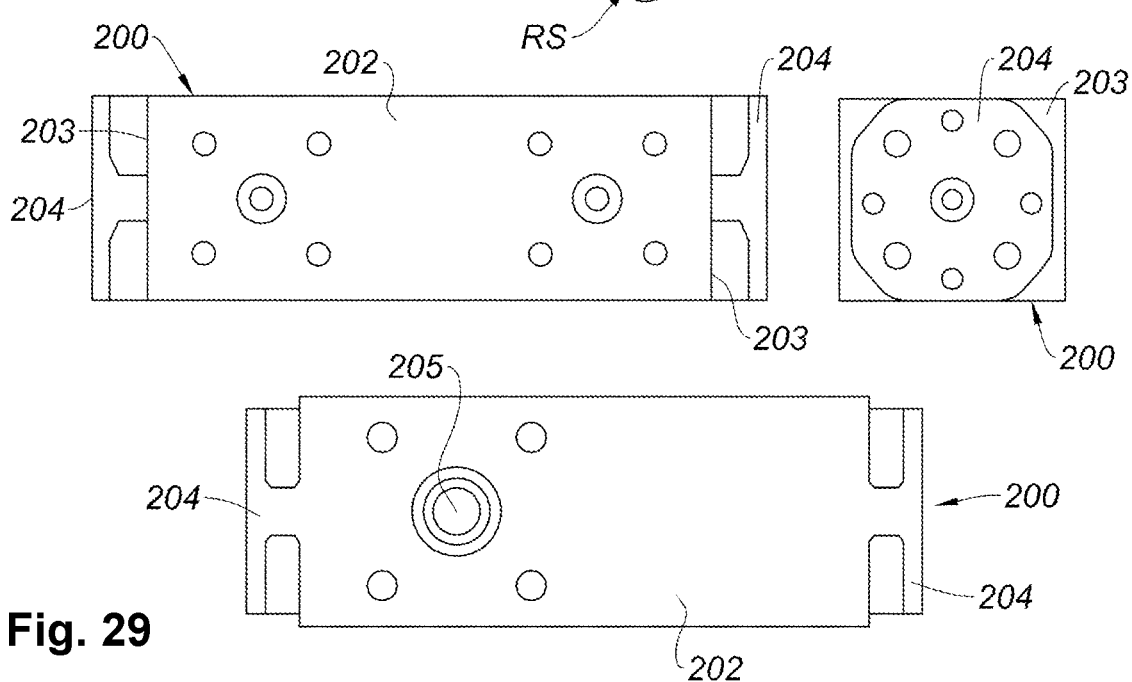
FIG. 29 is a side, front and top view of a collector incorporated in the distribution and regulation systems of FIGS. 27 and 28.
Figure 28:
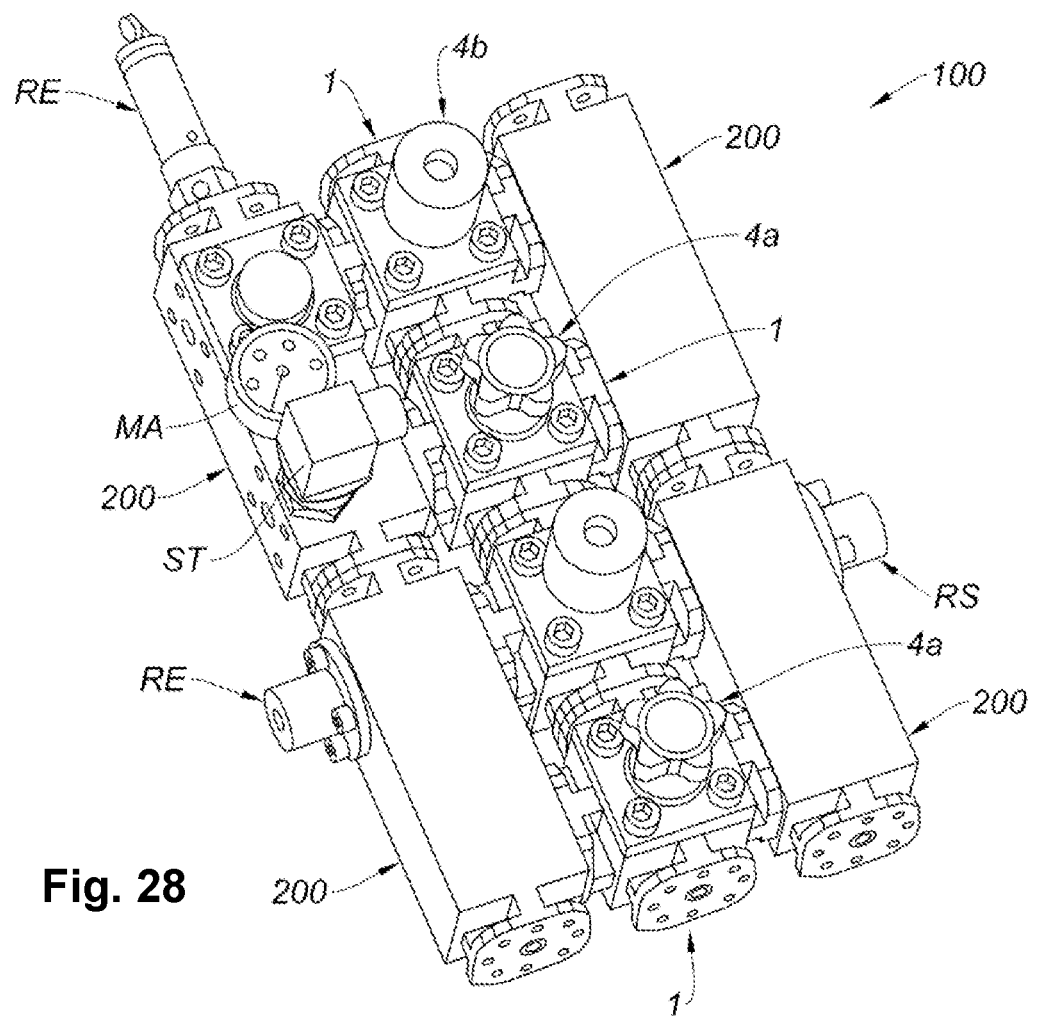

As shown in FIGS. 26 to 28, it is possible to form a kit for distributing and regulating a pressurized gas, which comprises:

several modules 1, wherein all the modules 1 are similar; and several distribution or regulation devices 3*a*, 3*b*, 4*a*, 4*b*, 4*c*, 5, 6 provided for a distribution or regulation of a gas passing in the inner chambers 2 of the main bodies 10 of the modules 1 once these modules 1 are provided with appropriate drillings 26 and once these modules 1 are coupled by fastening the subplates 15 together. In some variations of the present disclosure, all the modules 1 are identical.

Thus, with such a kit, it is possible to construct, in complete freedom, systems 100 for distributing and regulating a pressurized gas, in particular for a gaseous hydrogen distribution station for filling a fuel cell tank, where:

modules 1 are coupled by fastening at least one subplate 15 of a module on a subplate 15 of at least one adjacent module 1, setting in communication the central holes 18 of the subplates 15 fastened together;

distribution or regulation devices 3*a*, 3*b*, 4*a*, 4*b*, 4*c*, 5, 6 are fastened on the main bodies 10 of all or part of the modules 1, with their cartridges 7 received inside the inner chambers 2 and with the brackets 8, 80, 180 fastened on the upper faces 13 of the modules 1; and drillings 26 are formed in the central holes 18 of the subplates 15 which are fastened to another subplate 15, such drillings 26 forming communication channels opening into the upper bore 21 or into the intermediate bore 22 of the inner chamber 2 of the concerned module 1 in order to set in communication the distribution or regulation devices 3*a*, 3*b*, 4*a*, 4*b*, 4*c*, 5, 6 of the coupled modules 1.

In the example of FIG. 26, the distribution and regulation system 100 comprises four modules 1 successively supporting, from the inlet towards the outlet, a block valve with a manual actuator 4*a*, an anti-backflow isolation device 5, a pressure regulator with a pneumatic setting 3*b* and a block valve with an electric actuator 4*c*, wherein the first module 1 supports at the inlet an inlet connector RE fastened at the inlet on a subplate 15 and wherein the last module 1 supports at the outlet an outlet connector RS fastened at the outlet on a subplate 15.

In the examples of FIGS. 27 and 28, the distribution and regulation system 100 comprises modules 1 which support either a block valve with a manual actuator 4*a*, or a block valve with a pneumatic actuator 4*b*, or a pressure regulator with a mechanical setting 3*a*.

Inlet and outlet connectors RE, RS are also provided by being fastened on the subplates of some of the modules 1.

In the examples of FIGS. 27 and 28, the distribution and regulation system 100 also comprises collectors 200 each formed by an integral part made of a metallic material which comprises the main body 201 which has a rectangular parallelepiped general shape and which has:

four longitudinal faces 202 each having a length equivalent to that of two coupled modules 1, and two end faces 203 with dimensions equivalent to those of a face of a module 1, wherein each end face 203 is provided with a subplate 204 similar to the subplate 15 of a module 1. In some variations of the present disclosure the subplate 204 is identical to the subplate 15 of a module 1.

Figure 30:
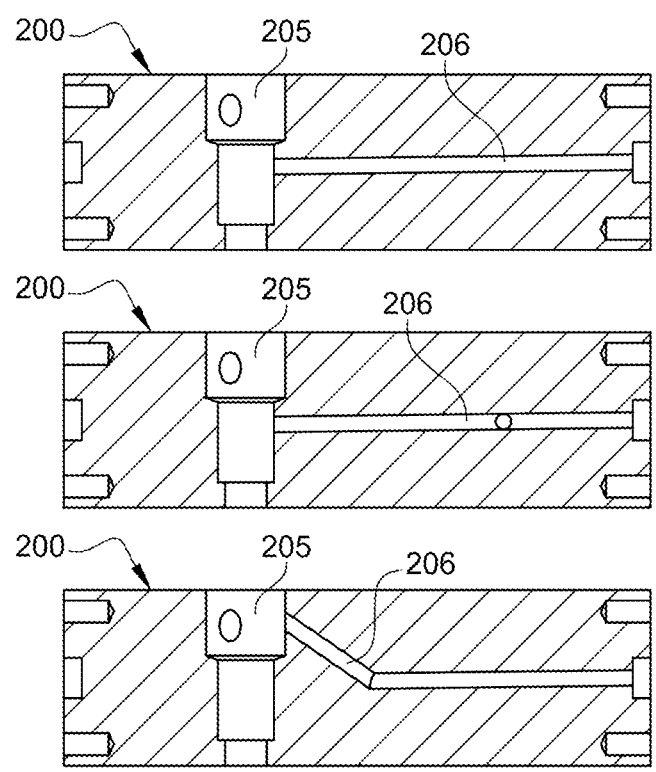
FIG. 30 illustrates cross-sectional views of the collector of FIG. 29 in three configuration examples of the inner drillings.

A collector 200 has an inner chamber 205 opening into two parallel longitudinal faces 202 and whose shape and dimensions are similar or equivalent to those of an inner chamber 2 of a module 1, so that a distribution or regulation device 3a, 3b, 4a, 4b, 4c, 5, 6 could be received and fastened on such a collector 200; drillings 206 in the collector 200 then being desired to establish the communications, and the number and the arrangement of the drillings 206 enable a plurality of configurations as schematized in FIG. 30.

A collector 200 also allows pairing two modules 1 on two longitudinal faces 202, as shown in FIGS. 27 and 28. In this respect, threaded holes are provided on these longitudinal faces 202 for fastening the brackets, and drillings will be provided in the collector for the circulation of the gas.

A collector 200 may also receive probes, such as manometers MA or temperature probes ST, as well as inlet connectors RE and outlet connectors RS.

Thus, the present disclosure allows making distribution and regulation systems 100 for ground installations (such as for example filling stations, transfer stations, productions facilities, storage facilities) and also for on-board installations (such as for example on supply vehicles).

The present disclosure also allows for:
very high standardization level and integration and modularity levels, with universal modules 1 and with cartridges 7 that are also universal, not to mention the aforementioned interchangeabilities;
a compactness level that is also high, with compact modules 1 and distribution or regulation devices 3a, 3b, 4a, 4b, 4c, 5, 6;
a safety level that is also high by suppressing connecting links and welded assemblies; and
a service rate guaranteed level that is also high thanks to the easy maintenance and/or replacement of the distribution or regulation devices 3a, 3b, 4a, 4b, 4c, 5, 6.

Spacially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A module for a distribution and regulation kit for distributing and regulating a pressurized gas, the module comprising:
a main body defining a parallelepiped shape and having four lateral faces parallel in pairs and extending between an upper face and a lower face parallel to one another; and
an inner chamber formed through the main body that opens at the upper face and the lower face, the inner chamber adapted to receive a distribution or regulation device, the inner chamber comprising:
a cylindrical upper bore opening into the upper face and having an internal diameter;
a cylindrical intermediate bore having an internal diameter smaller than the internal diameter of the cylindrical upper bore; and
a cylindrical lower bore opening into the lower face and having an internal diameter smaller than the internal diameter of the cylindrical intermediate bore,
wherein each lateral face includes a subplate adapted for fastening on a subplate of an adjacent module, wherein each subplate has peripheral holes and a central blind hole.

2. The module according to claim 1, wherein threaded holes are formed in the upper face.

3. A distribution and regulation kit for distributing and regulating a pressurized gas, the distributing and regulating kit comprising:
a plurality of modules according to claim 1; and
a plurality of distribution or regulation devices, each distribution or regulation device comprising a cartridge formed by a tubular body adapted to be received by the inner chamber of a module among the plurality of modules, wherein the cartridge comprises:
a first upper sleeve, which is cylindrical, having an external diameter, the first upper sleeve supporting at least one O-ring gasket and adapted to be mounted in the cylindrical upper bore;
a second upper sleeve, which is cylindrical, having an external diameter which is smaller than the internal diameter of the cylindrical upper bore and the external diameter of the first upper sleeve, and larger than the internal diameter of the cylindrical intermediate bore, the second upper sleeve having at least one upper through hole opening into an upper chamber defined at least partially by the second upper sleeve;
a first intermediate sleeve, which is cylindrical, supporting at least one O-ring gasket and adapted to be mounted in the cylindrical intermediate bore, the first intermediate sleeve having an external diameter which is smaller than the external diameter of the second upper sleeve;
a second intermediate sleeve, which is cylindrical, having an external diameter which is smaller than the internal diameter of the cylindrical intermediate bore and the external diameter of the first intermediate sleeve, and larger than the internal diameter of the cylindrical lower bore, the second intermediate sleeve having at least one intermediate through hole opening into an intermediate chamber defined at least partially by the second intermediate sleeve; and a lower sleeve, which is cylindrical, having an external diameter which is smaller than the external diameter of the second intermediate sleeve, wherein the lower sleeve supports at least one O-ring gasket and is adapted to be mounted in the cylindrical lower bore.

4. The distribution and regulation kit according to claim 3, wherein at least one distribution or regulation device among the plurality of distribution or regulation devices comprises, inside the cartridge, a plunger movable relative to a seat between a closed position where communication between the intermediate chamber and the upper chamber is closed and an open position where communication between the intermediate chamber and the upper chamber is open.

5. The distribution and regulation kit according to claim 4, wherein the plurality of distribution or regulation devices comprises at least one pressure regulator comprising:

a piston slidably mounted inside the second intermediate sleeve in the intermediate chamber forming an upstream chamber, wherein the piston has an upper end forming the plunger and a lower end surrounded by an O-ring gasket and sliding inside the lower sleeve in a lower orifice which does not open outwards;

a downstream body mounted static inside the second upper sleeve and defining the upper chamber forming a downstream chamber, wherein the downstream body has a central hole defining the seat forming a relief seat adapted to cooperate with the plunger;

an elastic biasing member adapted to urge the piston and the plunger in a direction towards the closed position, opposite to a reduced pressure in the downstream chamber which urges the piston and the plunger in a direction towards the open position;

an upper plug mounted static inside the first upper sleeve; and a tappet crossing the upper plug and adapted to exert a force on the plunger in a direction of the opening position, wherein the piston has an inner through channel having two opposite ends comprising an upper end open on a side of the downstream body and forming a drain seat and a lower end open into the lower orifice of the lower sleeve, and wherein the tappet is adapted to bear on and plug the drain seat, wherein the at least one pressure regulator further comprises:

a bracket fastened on the cartridge and including fastening elements for fastening the at least one pressure regulator on the upper face of a module among the plurality of modules, wherein the bracket embeds a push piston slidably mounted and adapted to bear on the tappet, the push piston extending beyond the bracket; and a setting system mounted on the bracket and acting on the push piston and thus on the tappet to enable a setting of an opening force of the plunger to relieve pressure.

6. The distribution and regulation kit according to claim 5, wherein the the setting system is:

a mechanical setting system comprising a support removably mounted on the bracket; or a pneumatic setting system comprising a support removably mounted on the bracket.

7. The distribution and regulation kit according to claim 5, wherein the setting system is a mechanical setting system comprising a support fastened on the bracket and supporting thereinside an elastic biasing member compressed between a lower journal on which bears the push piston and an upper journal whose position is mechanically settable to enable a setting of a pushing force exerted by the elastic biasing member on the push piston.

8. The distribution and regulation kit according to claim 5, wherein the setting system is a pneumatic setting system comprising a support fastened on the bracket and receiving thereinside a main piston, which is slidably mounted in the support, wherein the main piston acts on the push piston and is subjected to a pilot pressure source to enable a setting of the pushing force exerted by the main piston on the push piston.

9. The distribution and regulation kit according to claim 8, wherein the main piston has:

an upper section including an upper surface on which the pilot pressure acts; and a lower section including a lower surface acting on the push piston, wherein the lower surface has a surface area smaller than a surface area of the upper surface.

10. The distribution and regulation kit according to claim 9, wherein the pneumatic setting system comprises at least one secondary stage comprising a tubular secondary body affixed on the support and a secondary piston slidably mounted inside the tubular secondary body, wherein:

the tubular secondary body includes:

an upper portion defining a cylindrical upper cavity; and a lower portion crossed by a central hole having a diameter smaller than a diameter of the cylindrical upper cavity of the upper portion, the secondary piston includes:

an upper section defining an upper surface on which the pilot pressure acts and is mounted in the cylindrical upper cavity of the upper portion of the tubular secondary body; and a lower section defining a lower surface bearing on the upper surface of the main piston and mounted in the central hole of the lower portion of the tubular secondary body, wherein the lower surface of the secondary piston has a surface area smaller than a surface area of the upper surface of the secondary piston, and wherein the secondary piston defines an inner through channel opening into the lower surface and the upper surface of the secondary piston such that the pilot pressure is applied on the upper surface of the main piston throughout the inner through channel.

11. The distribution and regulation kit according to claim 4, wherein the plurality of distribution or regulation devices comprises at least one block valve comprising regulator members comprising:

a piston slidably mounted inside the second intermediate sleeve in the intermediate chamber forming an upstream chamber, wherein the piston has an upper end forming the plunger and a lower end surrounded by an O-ring gasket and sliding inside the lower sleeve in a lower orifice opening outwards;

a downstream body mounted static inside the second upper sleeve and defining the upper chamber forming a downstream chamber, wherein the downstream body has a central hole defining the seat cooperating with the plunger;

an elastic biasing member adapted to urge the piston and the plunger in a direction towards the closed position;
an upper plug mounted static inside the first upper sleeve; and
a tappet crossing the upper plug and adapted to exert a force on the plunger in a direction towards the opening position,
wherein the at least one block valve further comprises:
a bracket secured to the upper plug and including fastening elements for fastening the at least one block valve on the upper face of a module among the plurality of modules; and
an actuator mounted on the bracket and acting on the tappet to control a relative position of the plunger with respect to the seat between the closed position and the open position.

12. The distribution and regulation kit according to claim 11, wherein the at least one block valve comprises an actuator selected from the group consisting of:
a manual actuator comprising a knob secured to a push member screwed in the bracket and adapted to bear on the tappet;
a pneumatic actuator comprising a support fastened on the bracket and crossed by a push piston adapted to bear on the tappet under action of a control pressure source; and
an electric actuator comprising a support fastened on the bracket and crossed by a push member adapted to bear on the tappet under the action of an electric motor.

13. The distribution and regulation kit according to claim 12, wherein the actuator of the at least one block valve of each distribution or regulation device among the plurality of distribution or regulation devices are interchangeable, wherein the bracket comprises a threaded orifice inside which the push member of the manual actuator, the support of the pneumatic actuator and the support of the electric actuator can be screwed.

14. The distribution and regulation kit according to claim 4, wherein the plurality of distribution or regulation devices comprises at least one anti-backflow isolation device comprising:
a piston slidably mounted inside the first upper sleeve in the upper chamber forming a downstream chamber, wherein the piston has a lower end forming the plunger;
a downstream body mounted static inside the second upper sleeve and defining the upper chamber and the intermediate chamber forming an upstream chamber, wherein the downstream body has a central hole defining the seat cooperating with the plunger subjected to pressure of gas in the intermediate chamber in a direction of detachment with respect to the seat; and
an elastic biasing member urging the piston and the plunger in a direction towards the closed position,
wherein the anti-backflow isolation device further comprises a bracket including fastening elements for fastening the at least one anti-backflow isolation device on the upper face of a module among the plurality of modules, the bracket forming a closed lid such that the elastic biasing member bears on the bracket.

15. The distribution and regulation kit according to claim 3, wherein the plurality of distribution or regulation devices comprises at least one filtering device comprising a filter cartridge received inside the upper chamber and having an inlet opening into the intermediate chamber, and
wherein the at least one filtering device further comprises a bracket including fastening elements for fastening the at least one filtering device on the upper face of a module among the plurality of modules, the bracket forming a closed lid.

16. A distribution and regulation system for distributing and regulating a pressurized gas, formed at least partially from a distribution and regulation kit according to claim 3, wherein:
the plurality of modules are coupled by fastening at least one subplate of a module among the plurality of modules on a subplate of at least one adjacent module to set in communication central holes of the subplates fastened together;
the plurality of distribution or regulation devices are fastened on the main body of the plurality of modules, with cartridges received inside inner chambers of the plurality of modules;
drillings are formed in the central holes of the at least one subplate, the drillings forming communication channels opening into the cylindrical upper bore or into the cylindrical intermediate bore of the inner chamber of the module to set in communication the plurality of distribution or regulation devices of the plurality of coupled modules.

17. A gaseous hydrogen distribution station for filling a fuel cell tank, the gaseous hydrogen distribution station comprising at least one distribution and regulation system according to claim 16.

* * * * *